US012749024B2

(12) United States Patent
Park

(10) Patent No.: US 12,749,024 B2
(45) Date of Patent: Sep. 29, 2026

(54) AUTOMATIC ANALYSIS SYSTEM FOR QUALITY DATA BASED ON MACHINE LEARNING

(71) Applicant: HYUNDAI MOBIS CO., LTD., Seoul (KR)

(72) Inventor: Joon Hyung Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 948 days.

(21) Appl. No.: 17/846,263

(22) Filed: Jun. 22, 2022

(65) Prior Publication Data

US 2023/0041209 A1 Feb. 9, 2023

(30) Foreign Application Priority Data

Jul. 20, 2021 (KR) ........................ 10-2021-0095004
Jul. 26, 2021 (KR) ........................ 10-2021-0097727

(51) Int. Cl.
*G06N 20/20* (2019.01)
*G05B 19/418* (2006.01)
(Continued)

(52) U.S. Cl.
CPC ....... *G06N 20/20* (2019.01); *G05B 19/41875* (2013.01); *G05B 19/41885* (2013.01);
(Continued)

(58) Field of Classification Search
CPC .............. G06N 20/20; G05B 19/41875; G05B 19/41885; G06Q 10/06375; G06Q 10/06395; G06F 3/04847
See application file for complete search history.

(56) References Cited

U.S. PATENT DOCUMENTS 10,409,232 B2 * 9/2019 Webersinke ......... G05B 13/048
10,713,594 B2 7/2020 Szeto et al.
(Continued)

FOREIGN PATENT DOCUMENTS

CN 111343484 A 6/2020
JP 2019074969 A 5/2019
(Continued)

OTHER PUBLICATIONS

IEEE, The Authoritative Dictionary of IEEE Standard Terms (7th Ed.) (Year: 2000).*
(Continued)

*Primary Examiner* — Justin R. Blaufeld
(74) *Attorney, Agent, or Firm* — NovoTechIP International PLLC

(57) ABSTRACT

A quality data analysis apparatus and method for reducing time for product quality analysis and the quality cost by reducing the occurrence of product defects, the apparatus includes an input configured to obtain quality data on a product for process factors occurring in a production of the product, a data pre-processor to pre-process the quality data by encoding the process factors for each data types and setting the process factors that are lost, to a preset value, a determiner configured to determine whether the product is acceptable based on the process factors using machine learning, a data visualizer configured to generate an analysis report on a quality of the product based on the process factors and the determination, and a trainer configured to train the machine learning model using the quality data for learning and a first label relevant to the quality data for learning.

17 Claims, 17 Drawing Sheets

(51) Int. Cl.
*G06Q 10/0637* (2023.01)
*G06Q 10/0639* (2023.01)
*G06F 3/04847* (2022.01)

(52) U.S. Cl.
CPC . *G06Q 10/06375* (2013.01); *G06Q 10/06395* (2013.01); *G06F 3/04847* (2013.01)

(56) References Cited

U.S. PATENT DOCUMENTS

| | | | | |
|---|---|---|---|---|
| 11,055,639 | B1 * | 7/2021 | Cay | G06F 9/547 |
| 11,694,775 | B1 * | 7/2023 | Maier | G06N 20/00 705/2 |
| 2007/0067056 | A1 * | 3/2007 | Nishinohara | G05B 19/41885 700/121 |
| 2007/0094196 | A1 | 4/2007 | Shirai et al. | |
| 2010/0057651 | A1 * | 3/2010 | Fung | G06N 7/01 706/54 |
| 2011/0270779 | A1 * | 11/2011 | Showalter | G06Q 40/035 705/36 R |
| 2014/0358825 | A1 * | 12/2014 | Phillipps | G06N 20/20 706/11 |
| 2020/0050970 | A1 * | 2/2020 | Tanaka | G06N 20/20 |
| 2020/0159197 | A1 * | 5/2020 | Horiwaki | G05B 19/4184 |
| 2020/0166909 | A1 | 5/2020 | Noone et al. | |
| 2020/0202235 | A1 | 6/2020 | Chen et al. | |
| 2020/0286227 | A1 * | 9/2020 | Corredor | A61B 1/000096 |
| 2020/0380417 | A1 | 12/2020 | Briancon et al. | |
| 2020/0401120 | A1 * | 12/2020 | Putman | G05B 19/41875 |
| 2021/0049428 | A1 * | 2/2021 | Huang | G06F 17/18 |
| 2021/0200198 | A1 * | 7/2021 | Tokuno | G05B 13/0265 |
| 2021/0342847 | A1 * | 11/2021 | Shachar | G06N 20/00 |
| 2021/0373512 | A1 * | 12/2021 | Ma | G05B 13/048 |
| 2022/0067622 | A1 | 3/2022 | Devarakonda | |
| 2022/0076836 | A1 * | 3/2022 | Lu | G16H 10/20 |
| 2022/0121183 | A1 | 4/2022 | Kuhn et al. | |
| 2023/0017042 | A1 | 1/2023 | Kimura et al. | |
| 2024/0028830 | A1 * | 1/2024 | Orhan | H04L 43/16 |

FOREIGN PATENT DOCUMENTS

| | | | |
|---|---|---|---|
| JP | 2020521210 | A | 7/2020 |
| JP | 2021-082200 | A | 5/2021 |
| KR | 1020180056900 | A | 5/2018 |
| KR | 10-2021-0035164 | A | 3/2021 |
| KR | 1020210071882 | A | 6/2021 |

OTHER PUBLICATIONS

Microsoft Press, Microsoft Computer Dictionary (5th Ed.) (Year: 2002).*

Wilbert O. Galitz, The Essential Guide to User Interface Design (2nd. Ed.) (Year: 2002).*

Office Action dated Jun. 30, 2022 issued in corresponding Korean Application No. 10-2021-0095004.

Office Action issued Jul. 22, 2025 in corresponding U.S. Appl. No. 17/516,999.

Office Action issued on Nov. 21, 2025 in corresponding Chinese Patent Application No. 202111601025.3.

Korean Office Action issued on Jan. 1, 2026 in corresponding Korean Patent Application No. 10-2021-0097727.

Naver search homepage, https://igija.tistory.com/164, published Jun. 13, 2016.

* cited by examiner

Confirm the Feature Types

| Feature | Feature Types | Description |
|---|---|---|
| ☑ Process Factor 1 | Time ⌄ | Note On Type Of Process Factor 1 |
| ☑ Process Factor 2 | Categorical ⌄ | Note On Type Of Process Factor 2 |
| ☑ Process Factor 3 | Numeric ⌄ | Note On Type Of Process Factor 3 |

⋮

*FIG. 4*

AUTOMATIC ANALYSIS SYSTEM FOR QUALITY DATA BASED ON MACHINE LEARNING

CROSS-REFERENCE TO RELATED APPLICATIONS

This application claims the benefit under 35 USC § 119(a) of Korean Patent Application Number 10-2021-0095004, filed Jul. 20, 2021, and 10-2021-0097727, filed Jul. 26, 2021, in the Korean Intellectual Property Office, the entire disclosure of which is incorporated herein by reference for all purposes.

BACKGROUND

1. Technical Field

The present disclosure in some embodiments relates to a machine learning-based automatic quality data analysis system. More particularly, the present disclosure relates to a quality data analysis system and a quality data analysis method for training a machine learning-based inference model based on accumulated product quality data, analyzing quality data based on the trained inference model to provide an analysis report, and adjusting the process factors by using the inference model as a simulator.

2. Discussion of Related Art

The statements in this section merely provide background information related to the present disclosure and do not necessarily constitute prior art.

The conventional quality system accumulates quality data concerning a plurality of process features or process factors (hereinafter, 'process factors'), which occur in the production process of the product, and field claim data generated in the sales process, yet the data usage is nearly negligible. In terms of generating quality cost reduction, it is necessary to select process factors that cause defects by analyzing the correlation between accumulated field claim data and process factors and to improve defects by adjusting the value of the relevant process factors.

Recent years have seen sporadical attempts to provide quality data analysis using machine learning, but it takes an average of 2 to 3 months per process under shortage of data analysis experts to expand and develop the analyzed results, which poses an unsolved issue. Additionally, since quality data analysis is rarely a one-time event, adjustments in product specifications or production conditions bring up the challenge of having to reanalyze quality data and extend the results to field application.

Meanwhile, quality data collected in the production process is a high-value asset in terms of defect analysis, process improvement, and consequently quality cost reduction. However, the collected quality data are often badly plagued with process factor values that are so biased to hamper the integrity of the quality analysis process based on the quality data. One of the causes of such process factor bias is the unsystematic management of process factors.

In general, process factors can be adjusted within the range of quality control criteria. However, due to the managerial trait that the on-site person is responsible for directly changing or managing the process factors, each process factor is occasionally managed unchanged as a single process factor value. For instance, since the site manager is to judge whether to change the process factor values, a specific process factor value occasionally remains unchanged and is managed as a single value. These occasions, in particular, preclude the possibility to analyze the quality data at first.

Therefore, effective measures are needed to solve the process factor bias to accumulate quality data that are easily analyzed, to sort out therefrom process factors that cause defects, and to adjust the value of the detected process factors to reduce the defects.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method by a simulator for adjusting a quality control standard for a product, the method including selecting adjustment process factors from main process factors using a User Interface (UI), and obtaining adjustment factor values for the adjustment process factors, wherein the main process factors are previously selected in a training for an inference model; generating a determination based on the adjustment process factors using the inference model, wherein the determination indicates a probability of the product having okay or no good quality; selecting the adjustment factor values as optimal factor values for the adjustment process factors, when the probability of the no good product is less than a preset reference probability; and changing the quality control standard for the adjustment process factors based on the optimal factor values.

The method may include providing the determination to a user, using the User Interface.

The obtaining of the adjustment factor values and the generating of the determination may be performed again, when the probability of the no good product is equal to or greater than the reference probability.

The obtaining of the adjustment factor values may include selecting the adjustment process factors using first check-boxes, and adjusting the adjustment factor values according to data types of the adjustment process factors.

The obtaining of the adjustment factor values may include selecting a category of an adjustment factor value using a second check box when a data type of a process factor for adjusting is a category type, and adjusting the adjustment factor value using a slider when the data type of the process factor for adjusting is a numerical type.

The obtaining of the adjustment factor value may include, for process factors excluded from the adjustment process factors among the main process factors, setting values of the process factors to preset values when an XGBoost algorithm-based model is adopted as the inference model, and setting the values of the process factors to mode values if the process factors are category types or setting the values of the process factors to median values if the process factors are numerical types, when a different algorithm-based model is adopted as the inference model.

The training may include training four machine learning models that are algorithms of a decision tree, a random forest, an XGBoost (Extreme Gradient Boosting), and a LightGBM (Light Gradient Boosting Model), which are implemented based on a tree, using quality data for learning and a corresponding label, and performing training on each of the machine learning models to maximize an information gain in each branch constituting the tree based on the label.

The training may include, when a number of process factors constituting the quality data for learning exceeds a preset number, performing a T-test on the process factors or performing comparison with the information gain of the process factors to select the main process factors such that the number of the process factors is equal to or less than the preset number.

The training may include selecting a model with the best training performance among the four machine learning models as the inference model, and the training performance comprises accuracy, precision, recall, and F1 score based on the label, and a determination generated by each of the machine learning models.

The method may include providing feature importance for each of the main process factors for reference in selecting the adjustment process factors using the User Interface, wherein the feature importance is generated as a result of the training for the inference model.

In another general aspect, there is provided a simulator for adjusting a quality control standard, including an adjuster that is configured to select adjustment process factors from main process factors, and obtain adjustment factor values for the adjustment process factors, wherein the main process factors are previously selected in training for an inference model; a determination output is configured to generate a determination based on the adjustment process factors using the inference model, wherein the determination indicates a probability of a product having okay or no good quality; a criteria applier is configured to select the adjustment factor values as optimal factor values for the adjustment process factors when the probability of the no good product is less than a preset reference probability, and change the quality control standard for the adjustment process factors based on the optimal factor values.

The adjuster may be configured to obtain new adjustment factor values and the determination output is further configured to generate a new determination, when the probability of the no good product is equal to or greater than the reference probability.

The simulator may include a User Interface (UI) configured to select the adjustment process factors using check-boxes in the User Interface, and adjust the adjustment factor values according to data types of the adjustment process factors.

For process factors excluded from the adjustment process factors among the main process factors, values of the process factors are set to preset values when an XGBoost algorithm-based model is adopted as the inference model, and the values of the process factors are set to mode values if the process factors are category types or the values of the process factors are set to median values if the process factors are numerical types when a different algorithm-based model is adopted as the inference model.

The User Interface may be configured to provide the determination to a user, and provide feature importance for each of the main process factors for reference in selecting the adjustment process factors, and the feature importance is generated as a result of training for the inference model.

The simulator may include a trainer configured to train four machine learning models that are algorithms of a decision tree, a random forest, an XGBoost (Extreme Gradient Boosting), and a LightGBM (Light Gradient Boosting Model), which are implemented based on a tree, using quality data for learning and a corresponding label, and perform training on each of the machine learning models to maximize an information gain in each branch constituting the tree based on the label.

When the number of the process factors constituting the quality data for learning exceeds the preset number, the trainer may be configured to perform a T-test on process factors or perform comparison with the information gain of the process factors to select the main process factors such that a number of the process factors is equal to or less than a preset number.

The trainer may be configured to select a model with the best training performance among the four machine learning models as the inference model, wherein the training performance comprises accuracy, precision, recall, and F1 score based on the label, and a determination generated by each of the machine learning models.

In another general aspect, there is provided a non-transitory computer-readable recording medium storing instructions that, when executed by a processor, cause a processor to perform: selecting adjustment process factors from main process factors using a User Interface (UI), and obtaining adjustment factor values for the adjustment process factors, wherein the main process factors are previously selected in a training for an inference model; generating a determination based on the adjustment process factors using the inference model, wherein the determination indicates a probability of a product having okay or no good quality; selecting the adjustment factor values as an optimal factor values for the adjustment process factors, when the probability of the no good product is less than a preset reference probability; and changing the quality control standard for the adjustment process factors based on the optimal factor values.

Other features and aspects will be apparent from the following detailed description, the drawings, and the claims.

BRIEF DESCRIPTION OF THE DRAWINGS

FIG. 4 is a diagram illustrating a UI for selecting process factors according to at least one embodiment of the present disclosure.

Figure 1:
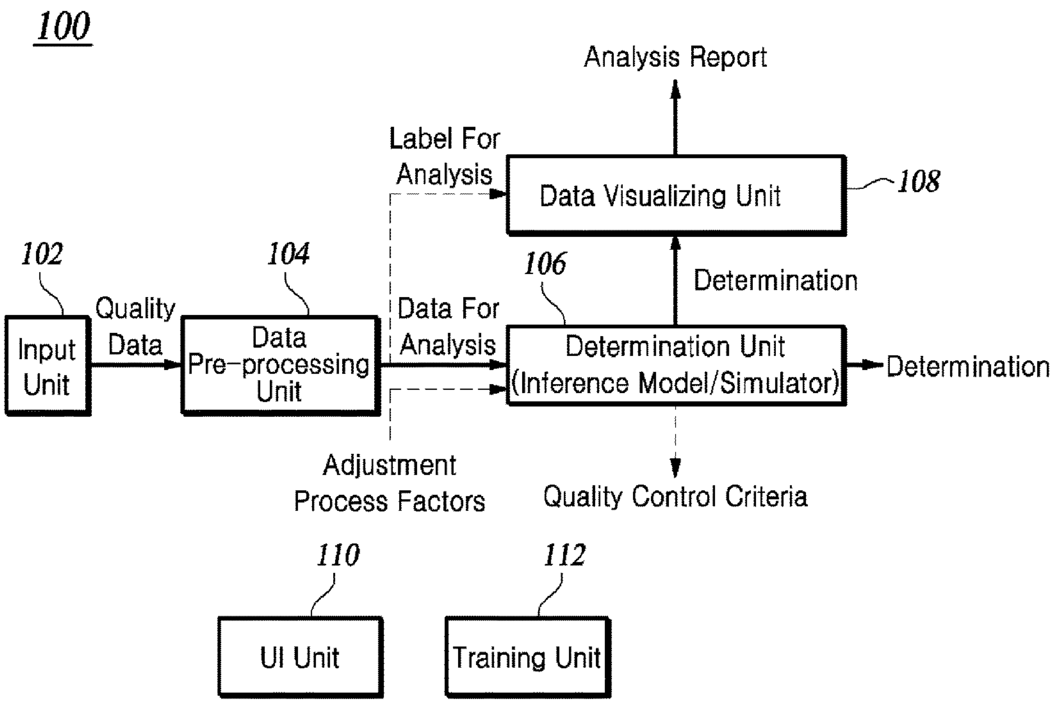
FIG. 1 is a schematic diagram of a quality data analysis system according to at least one embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms “a”, “an”, and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being “connected”, “coupled”, or “attached” to another constituent element, it should be understood that one constituent element can be connected or attached directly to another constituent element, and an intervening constituent element can also be “connected”, “coupled”, or “attached” to the constituent elements.

The detailed description to be disclosed hereinafter together with the accompanying drawings is intended to describe illustrative embodiments of the present disclosure and is not intended to represent the only embodiments in which the present disclosure may be practiced. When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

The illustrative embodiments disclose the contents of a machine learning-based automatic quality data analysis system. More particularly, to reduce the time required for performing a quality analysis on a product and to reduce the quality cost by reducing the occurrence of defects, the present disclosure in some embodiments provides or outputs a quality data analysis system and a quality data analysis method for training a machine learning-based inference model based on accumulated quality data, analyzing quality data based on the inference model to provide an analysis report, and making an adjustment to process factors by using the inference model as a simulator.

In the following description, since the present disclosure can provide or output a machine learning-based quality analysis service to a user, e.g., field worker or field person in charge, the service that can be provided to the user by the quality data analysis system according to this embodiment is represented as Machine Learning as a Service or MLaaS.

FIG. 1 is a schematic diagram of a quality data analysis system 100 according to at least one embodiment of the present disclosure.

The quality data analysis system (hereinafter, ‘analysis system’) 100 according to at least one embodiment trains a machine learning-based inference model based on accumulated quality data on a product, utilizes the inference model as a basis for analyzing quality data and thereby providing (or outputting) an analysis report and utilizes the inference model as a simulator for adjusting process factors. The analysis system 100 includes all or some of an input unit 102 (may also be referred to as input 102), a data pre-processing unit 104 (may also be referred to as data pre-processor 104), a determination unit 106 (may also be referred to as determiner 106), and a data visualizing unit 108 (may also be referred to as data visualizer 108).

Here, the components included in the analysis system 100 according to the present disclosure are not necessarily limited to those specified above. For example, the analysis system 100 may further include a UI unit 110 to provide convenience to a user in using MLaaS. Additionally, the analysis system 100 may further include a training unit 112 (may also be referred to as trainer 112) for training the inference model included in the determination unit 106 or it may be implemented to be linked with an external training unit.

FIG. 1 is an illustrative configuration of the analysis system 100 according to at least one embodiment, and various other analysis system configurations may be implemented including different components or different links between the components in compliance with the form of the input unit, the operation of the data pre-processing unit, the structure and operation of the inference model included in the determination unit, the operation of the quality data analysis unit, the structure and operation of the training unit, and the configuration of the UI unit.

The input unit 102 obtains quality data on the product. Here, the product may be a part included in a vehicle, such as a gearbox. Quality data may be collected concerning a plurality of process factors that are applied to or generated in the production process of the product.

The process factors may include all or some of an input factor for adjusting the production process of a product, a mid-process output factor formed in the middle of the production process, or an output factor generated as a result of the production process.

Meanwhile, the process factors inputted for the quality data analysis may be the main process factors as selected in the pre-training process on the inference model. The selection process of these main process factors will be explained in the training process on the inference model.

The input unit 102 may set data types for the process factors used as an input to an inference model. Here, the process factors may include numeric-type process factors expressed as numerical values and category-type or categorical process factors expressed as characters. As another data type, there is a time type including information on the time at which data were collected, but it may be removed in the process of selecting main process factors during the training process.

Meanwhile, to analyze the performance of the inference model, the quality data may include a factor that can be used as a target output, i.e., a label for analysis. Here, the included factor is e.g., information on whether or not a field claim is generated against a product. The input unit 102 sets the factor used as the target output as a target factor.

The data pre-processing unit 104 performs an appropriate encoding process for each data type of the process factors and sets lost data that occurred in the data collection process to an appropriate value.

The data pre-processing unit 104 may perform an encoding process of converting the categorical process factor into an embedding value suitable for an inference model.

Example categorical data may include a target factor indicating whether or not a field claim has occurred against the product. For instance, the encoding process for the target factor indicates a case where no field claim occurs against the product as 0 and a case where a field claim occurs as 1. Accordingly, encoding for such a target factor may be a process of generating a label for analysis toward the quality analysis based on an inference model.

Additionally, the data pre-processing unit 104 may set the value of the lost process factor from the data collection process. For example, a numeric-type process factor may be set as a median value, and a categorical process factor may be set as a mode value.

The determination unit 106 includes an inference model and generates a determination on whether the product is okay (OK) or no good (NG) by using the inference model based on a plurality of preprocessed process factors. Here, the determination may be a probability value for OK (i.e., being of acceptable quality) or NG (i.e., being of unacceptable quality) of the product to indicate whether the product is acceptable.

The determination that the product is no good may indicate a case where a field claim has occurred against the product. So, the determination that the product is okay indicates the case where no field claim occurs against the product.

The inference model may be implemented in the form of a machine learning model that is among four of such models implementing machine learning algorithms, exhibiting good performance on quality data, such as a tree-based decision tree, a random forest, Extreme Gradient Boosting (XGBoost), and Light Gradient Boosting Model (LightGBM). Using the training process, the training unit 112 may select a model with the best performance as an inference model from among the models to which the four machine learning algorithms are applied, respectively. A training process for selecting an inference model from the models learned the determination of okay or no good of the product will be described below.

The data visualizing unit 108 generates an analysis report on the product quality analysis or training result of the inference model based on the plurality of process factors, the label for analysis, and the determination.

Figure 2:
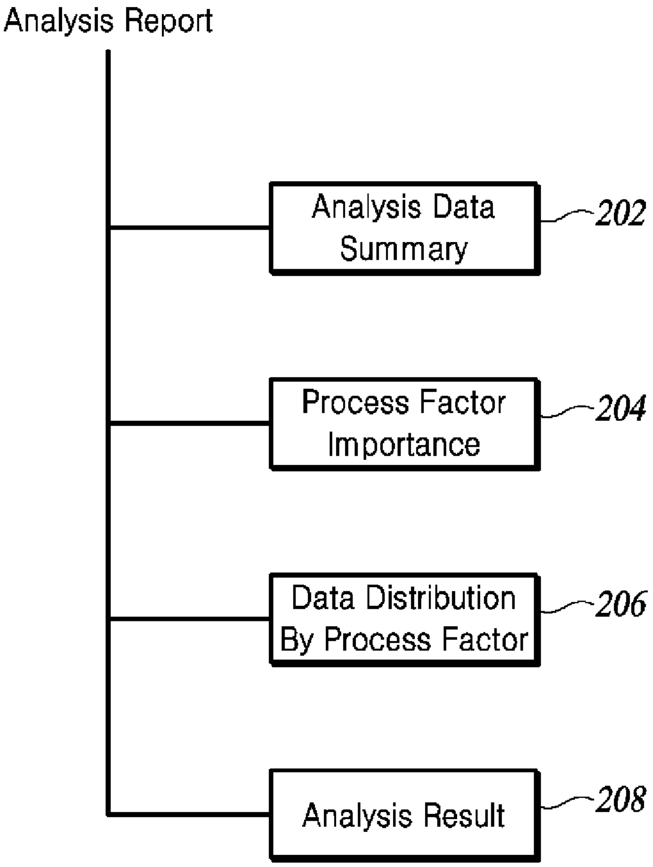
FIG. 2 is a diagram illustrating components of an analysis report according to at least one embodiment of the present disclosure.

FIG. 2 is a diagram illustrating components of an analysis report according to at least one embodiment of the present disclosure.

To comprehensively/microscopically represent the effect of each of the process factors on the determination, that is, okay or no good quality of the product, the analysis report provided by the data visualizing unit 108 may include all or some of an analysis data summary 202, process factor importance 204, a data distribution 206 by process factor, and an analysis result 208.

The analysis data summary 202 represents overall information on the process factors constituting the quality data. Here, the overall information may include a data type, a mode value, a minimum value, a maximum value, a mean, a standard deviation, and the like. The analysis data summary 202 may be provided as a result for quality analysis of the product or training of the inference model.

The process factor importance 204 indicate the feature importances of the process factors, allowing to confirm the influence of each process factor on the determination. The process factor importance 204 may be provided as a result for training of the inference model. The feature importances are the result of a tree-based machine learning algorithm, which will be described in detail below.

The data distribution 206 by process factor represents the distribution of the relationships between the respective process factors and the determination or between the respective process factors and the label for analysis.

The analysis result 208 represents a performance analysis performed on the inference model based on the determination and the label for analysis. The analysis result 208 may be provided as a result for product quality analysis or training of the inference model. The analysis result 208 will be described below.

The analysis report may be utilized in the process of generating new quality control standards or criteria by changing or revising the quality control criteria. Additionally, an analysis report may be generated to confirm the factors of the quality data collected in the production process to which the new quality control criteria are applied.

Meanwhile, the determination unit 106 may use the inference model as a simulator for calculating and generating the new quality control criteria.

For a specific process factor, upon setting the adjusted factor value, the determination unit 106 inputs the adjusted process factors into the simulator to generate a simulated determination. By using the adjusted process factors and the corresponding determination, new quality control criteria may be generated on the process factors toward reducing the occurrence of product defects.

Meanwhile, the simulator may include additional components to provide convenience to the user. So the following describes a simulator representing a system including an inference model and additional components.

Figure 3:
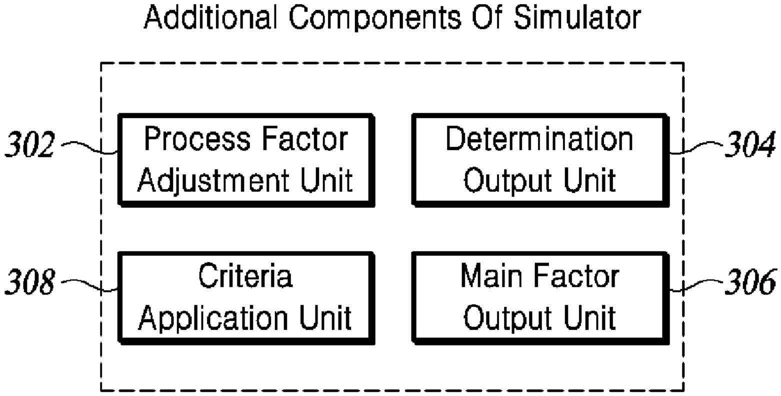
FIG. 3 is a schematic diagram of additional components of a simulator according to at least one embodiment of the present disclosure.

FIG. 3 is a schematic diagram of additional components of a simulator according to at least one embodiment of the present disclosure.

The simulator includes, for selection and adjustment of the process factors and provision of the determinations, all or some of a process factor 302 (may also be referred to as adjuster 302), a determination output unit 304 (may also be referred to as determination output 304), a main factor output unit 306 (may also be referred to as main factor output 306), and a criteria application unit 308 (may also be referred to as criteria applier 308).

The process factor adjustment unit 302 selects one or more adjustment process factors from the main process factors and adjusts the values of the adjustment process factors. As described above, selecting the adjustment process factors may utilize the feature importance and data distribution 206 for each process factor provided by the analysis report.

Meanwhile, the process factor adjustment unit 302 may select input factors as described above as the adjustment process factors.

When the selected adjustment process factors are categorical process factors, the user's desired category may be selected by using checkboxes. With numeric-type process factors, the users may use a slider to adjust the process factor values. Since a process factor may be excluded from the simulation by unchecking the checkbox, a simulation can also be performed on a single process factor. In this case, when the XGBoost-based model is employed as the inference model, the excluded process factor is set to a preset value, and when another algorithm-based model is employed, it may be set to a mode value or a median value according to the data type of the process factor.

Meanwhile, when adjusting the process factor values, by referring to the T-test result for the relevant process factors, the process factor value may be adjusted to minimize the distribution of product defects.

The determination output unit 304 provides a determination in a case where the adjustment process factors are inputted to the simulator. As described above, the determination is a probability value of the product having the okay or no good quality or a quality that is acceptable.

Meanwhile, the user may check the influence of the adjustment process factors on the occurrence of defects by changing and inputting the values of the adjustment process factors and then checking the determination.

The main factor output unit 306 provides the feature importance of the process factors being used by the simulator. Here, as for the feature importance, the feature importance is reused once generated in the training process for the inference model that is used as the simulator.

The criteria application unit 308 selects optimal factor values of the adjustment process factors based on the determination on the values of the adjustment process factors, based on which it changes the quality control criteria for the adjustment process factors.

As described above, according to some embodiments providing an analysis system that adjusts process factors by using an inference model as a simulator, the present disclosure can reduce the occurrence of product defects.

The UI unit 110 serves to obtain from the user an input related to the analysis system 100 or provide an output generated by the analysis system 100 on a display, thereby linking MLaaS provided by the analysis system 100 with the user. Based on the UI unit 110, a user's input may be provided to the analysis system 100 by way of a mouse, a keyboard, or the like. The following describes operations of the UI unit 100 referring to FIGS. 4 to 7.

FIG. 4 is a diagram illustrating a UI for selecting process factors according to at least one embodiment of the present disclosure.

The UI unit 110 includes checkboxes for selecting process factors from quality data applied to data analysis, as illustrated in FIG. 4. To the process factors whose checkboxes are selected, the process factor types may be additionally inputted, presenting descriptions on the restrictions on the process factors by type.

The same contents as illustrated in FIG. 4 may also be used as checkboxes for selecting process factors for use in the training of an inference model.

Meanwhile, the UI unit 110 includes an input interface for setting a target factor among the process factors.

Figure 5:
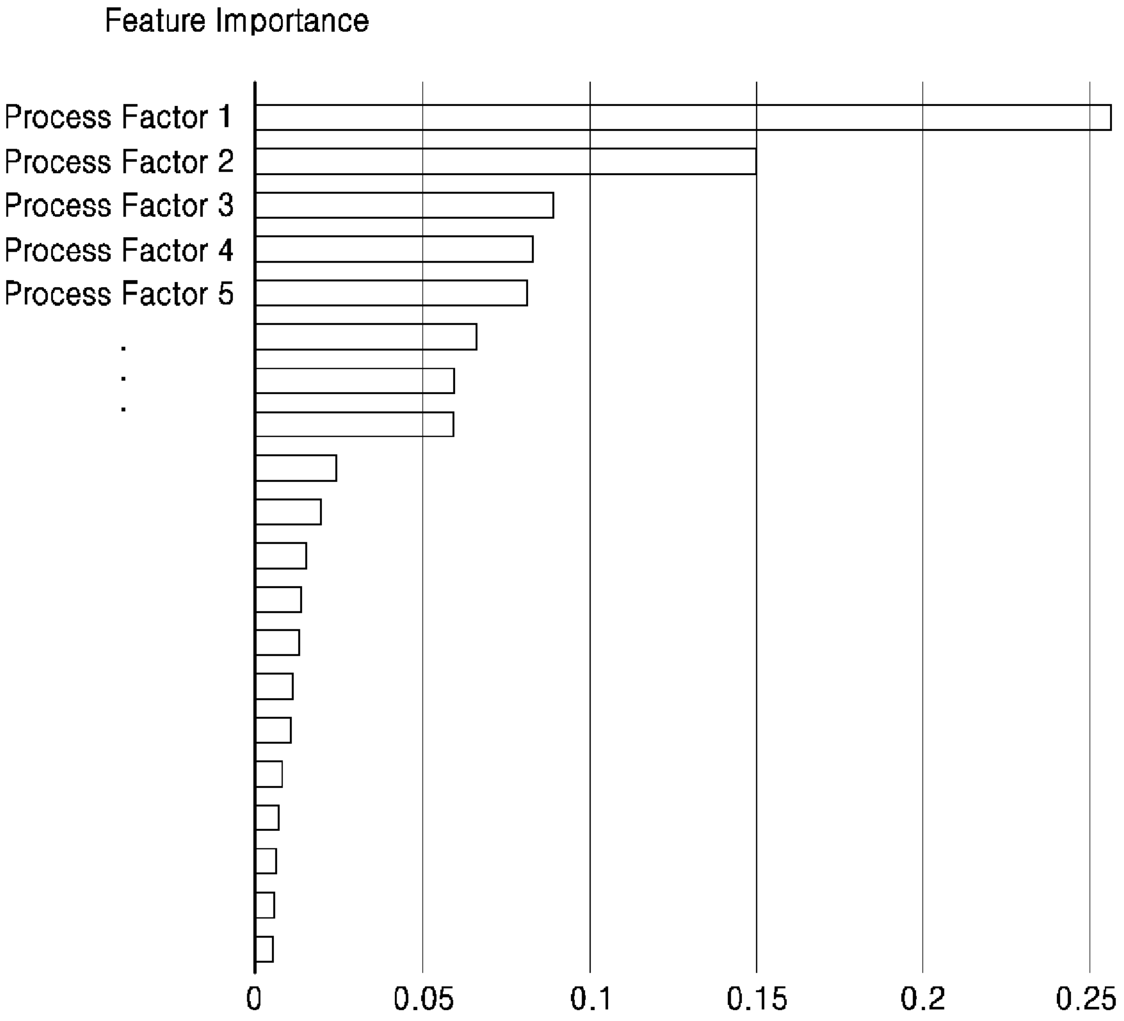
FIG. 5 is a diagram illustrating a UI for indicating the process factor importance according to at least one embodiment of the present disclosure.

The UI unit 110 provides, on the display, the analysis report including the analysis data summary 202, the process factor importance 204, the data distribution 206 for each process factor, or the analysis result 208. For example, the UI unit 110 may provide feature importances of process factors, as illustrated in FIG. 5.

Further, the UI unit 110 may provide the analysis result 208 based on the determination by the inference model.

Figure 6:
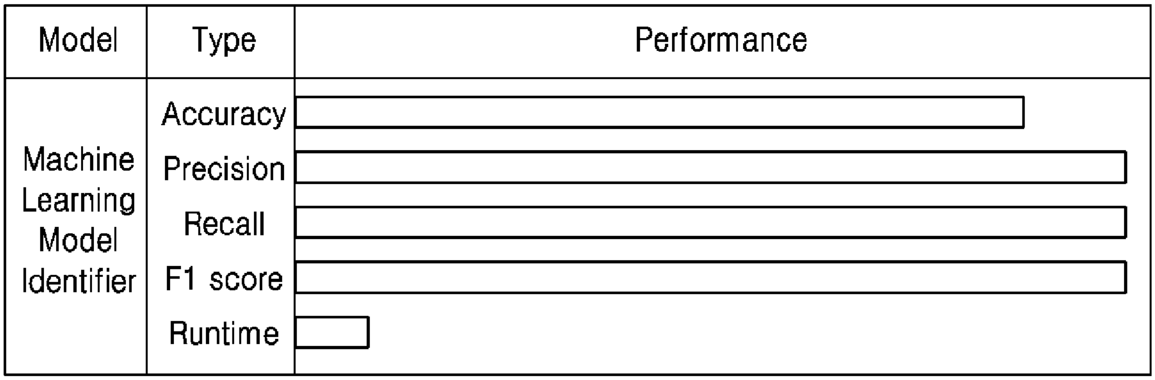
FIG. 6 is a diagram illustrating a UI for displaying an analysis result according to at least one embodiment of the present disclosure.

The analysis result 208 may include, as illustrated in FIG. 6, accuracy, precision, recall, and F1 score for the okay or no good quality as determined on the product.

Here, the accuracy is the rate at which the prediction of okay or no good quality matches the ground truth (GT), i.e., correct answer or label. The precision is the ratio of the products' GT values of defect to the products being predicted to be defective, and the recall is the ratio of defect predictions of the products to the products' GT values of the defect. The F1 score is the harmonic mean value of the precision and the recall.

Meanwhile, in FIG. 6 illustrating the UI for displaying an analysis result, the 'machine learning model identifier' cell indicates the algorithm implemented by the machine learning model, that is, one of a decision tree, a random forest, XGBoost, and LightGBM.

The UI unit 110 provides, on the display, a training result for a model to which each of the four machine learning algorithms is applied. The analysis result 208 as illustrated in FIG. 6 may also be used as a training result for each algorithm-based model. Additionally, the training result may include a runtime which is the time taken for training the inference model.

Figure 7:
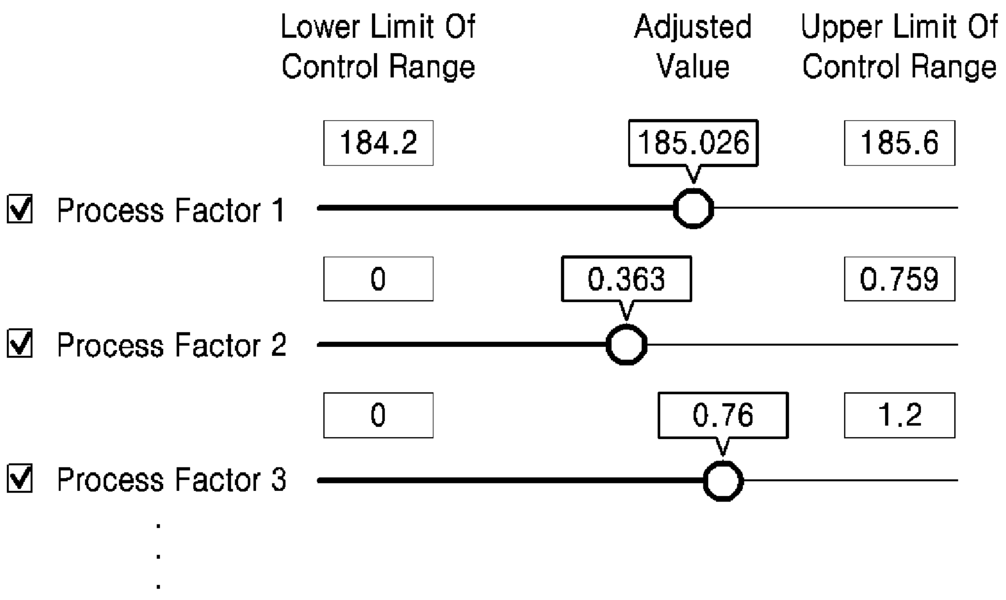
FIG. 7 is a diagram illustrating a UI for adjusting process factors according to at least one embodiment of the present disclosure.

When using the simulator, the UI unit 110 further displays checkboxes as illustrated in FIG. 7 for obtaining inputs related to the process factor adjustment unit 302. About the process factors whose checkbox is selected, the process factor value may be adjusted according to the data type.

Additionally, the UI unit 110 provides, on the display, the results related to the determination output unit 304 and the main factor output unit 306.

The UI unit 100 may provide a heatmap in the form of a matrix used for correlation analysis between process factors.

Additionally, the UI unit 100 provides an input interface for obtaining preset values, e.g., preset value indicating the number of main process factors, which are the basis of various judgments on MLaaS.

The interface supported by the UI unit 100 is not limited to the above presentations, and an interface may be further added as necessary for linking MLaaS with the user.

The training unit 112 (may also be referred to as trainer 112) performs training on the inference model by using the quality data for learning and the corresponding labels.

As described above, the inference model may be implemented in the form of a machine learning model, and it may be a model implementation of one of four machine learning algorithms, such as a decision tree, a random forest, XGBoost, and LightGBM.

The decision tree is a model that classifies data according to a specific criterion, e.g., a specific value of a numeric-type process factor, or a category of a categorical process factor, etc. Branching in the decision tree is performed toward maximizing the information gain by a process factor used for the branching, which is called training for a decision tree.

When branching a root node based on one process factor into two leaf nodes, the information gain may be calculated by subtracting the information of the two leaf nodes from the information of the root node. In this case, the label is used in the process of calculating the information gain. Since the branched leaf nodes are in a more orderly state, the information of two leaf nodes cannot be greater than the information of the root node. Therefore, the information gain always has a value greater than or equal to zero. Meanwhile, information for use may be entropy or Gini impurity.

The random forest is an ensemble model based on a plurality of decision trees, and it aggregates decisions made by a plurality of decision trees to generate the final output. In aggregating the decisions into the final output, the random forest takes, for example, a decision by the majority when working as a classification model, and takes, for example, the average of the decisions when working as a regression model. Training on the respective decision trees included in the random forest may be performed in the same way as training of a single decision tree. The random forest features a bootstrapping that is allowed between the training data sets used for training the respective decision trees. Bagging is termed to represent 'bootstrap+aggregating,' encompassing the bootstrap of the random forest and the aggregation of decisions by the plurality of decision trees.

Both XGBoost and LightGBM are gradient boosting model-based or GBM-based algorithms. GBM is an ensemble algorithm of the boosting family. Here, boosting is a process of sequentially generating (i.e., training) a plurality of weak classifiers and then combining them to generate a strong classifier. For example, with three weak classifiers A, B, and C, classifier A is generated which informs to generate classifier B which in turn informs to generate classifier C, to finally combine all the classifiers, to make a strong classifier. In this boosting process, GBM utilizes the negative gradient calculated from the weak model of a leading stage as a basis for generating a weak model of the trailing stage.

The XGBoost algorithm is a GBM-based algorithm for training an ensemble model in which a weak classifier is implemented by a decision trees. The XGBoost algorithm is advantageous in that it is useful in preventing overfitting, which is a disadvantage of GBM, by including a regulation term in the loss function for learning.

The LightGBM algorithm is also a GBM-based algorithm for training an ensemble model in which a weak classifier is implemented by a decision trees. The LightGBM algorithm performs tree branching leaf-wise rather than level-wise, to improve the slow learning speed of GBM-based algorithms. The LightGBM algorithm is known to be suitable for processing large amounts of data because it causes an overfitting problem with too little data being used.

Since all four machine learning algorithms operate based on a decision tree, they can generate feature importances of the process factors used for branching as a result of learning.

The feature importance for one process factor is the ratio of the total information gain generated by one process factor to the total information gain by the (multiple) decision trees. In other words, the feature importance for one process factor indicates the degree to which all branches depending on the one process factor contributed to the total information gain generated by the learned decision tree. It is regarded that the higher the feature importance, the higher the contribution of the relevant process factor to generating the determination by the inference model.

With these feature importances made available for use when adjusting the quality control criteria for specific process factors in some embodiments, the present disclosure utilizes, as a machine learning algorithm for an inference model, one of the decision tree, random forest, XGBoost, and LightGBM as described above.

Using the training process, the training unit 112 may elect, as an inference model, a model with the best performance among models to which the four machine learning algorithms are applied, respectively. After electing an algorithm for the inference model, the training unit 112 presents, as a decision basis, the training result for each of the models implementing the four machine learning algorithms.

The following describes a training process performed by the training unit 112 on an inference model with the examples of FIGS. 8 to 11.

Figure 8:
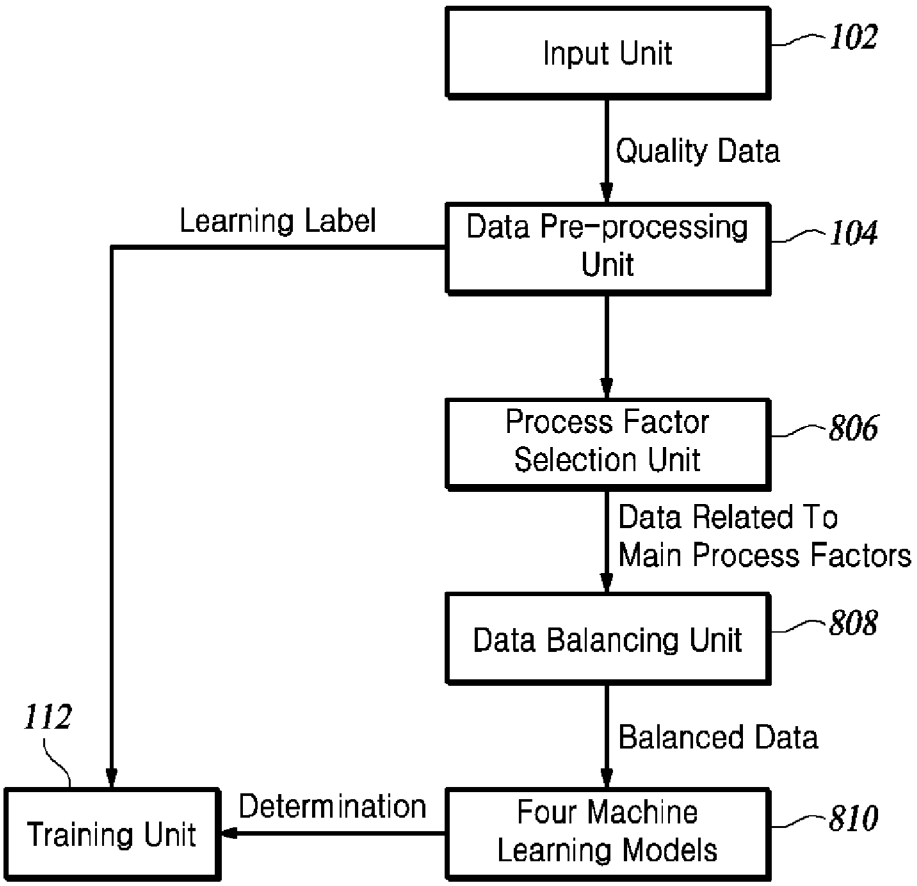
FIG. 8 is a schematic diagram of additional components used for training an inference model according to at least one embodiment of the present disclosure.

FIG. 8 is a schematic diagram of additional components used for training an inference model according to at least one embodiment of the present disclosure.

To train the inference model, the training unit 112 may use, in addition to the input unit 102, all or some of a data pre-processing unit 104, a process factor selection unit 806 (may also be referred to as process factor selector 806), a data balancing unit 808 (may also be referred to as data balancer 808), and four machine learning models 810 (hereinafter, used interchangeably with 'four models'). Here, the four models 810 represent models to which the four machine learning algorithms, as described above, are respectively applied.

The input unit 102 obtains quality data on a product, for use in training. The quality data may be collected concerning a plurality of process factors that are applied to or generated in the production process of a product.

The process factors may include all or some of an input factor for adjusting the production process of a product, a mid-process output factor formed in the middle of the production process, or an output factor generated as a result of the production process.

The input unit 102 may set data types for the process factors used for training. Here, the process factors may include numeric-type process factors expressed as numerical values, category-type or categorical process factors expressed as characters, and time-type process factors including information on the time at which data were collected.

Meanwhile, in the training process of the inference model, the quality data may include a factor (e.g., whether or not a field claim is generated against a product) that can be used as a target output, i.e., a label for learning. The input unit 102 sets the factor used as the target output as a target factor.

The category of the process factor and the target factor may be set by using the UI unit 110, as described above.

The data pre-processing unit 104 performs an appropriate encoding process for each data type of the process factor and sets lost data that occurred in the collection process to an appropriate value.

Figure 9:
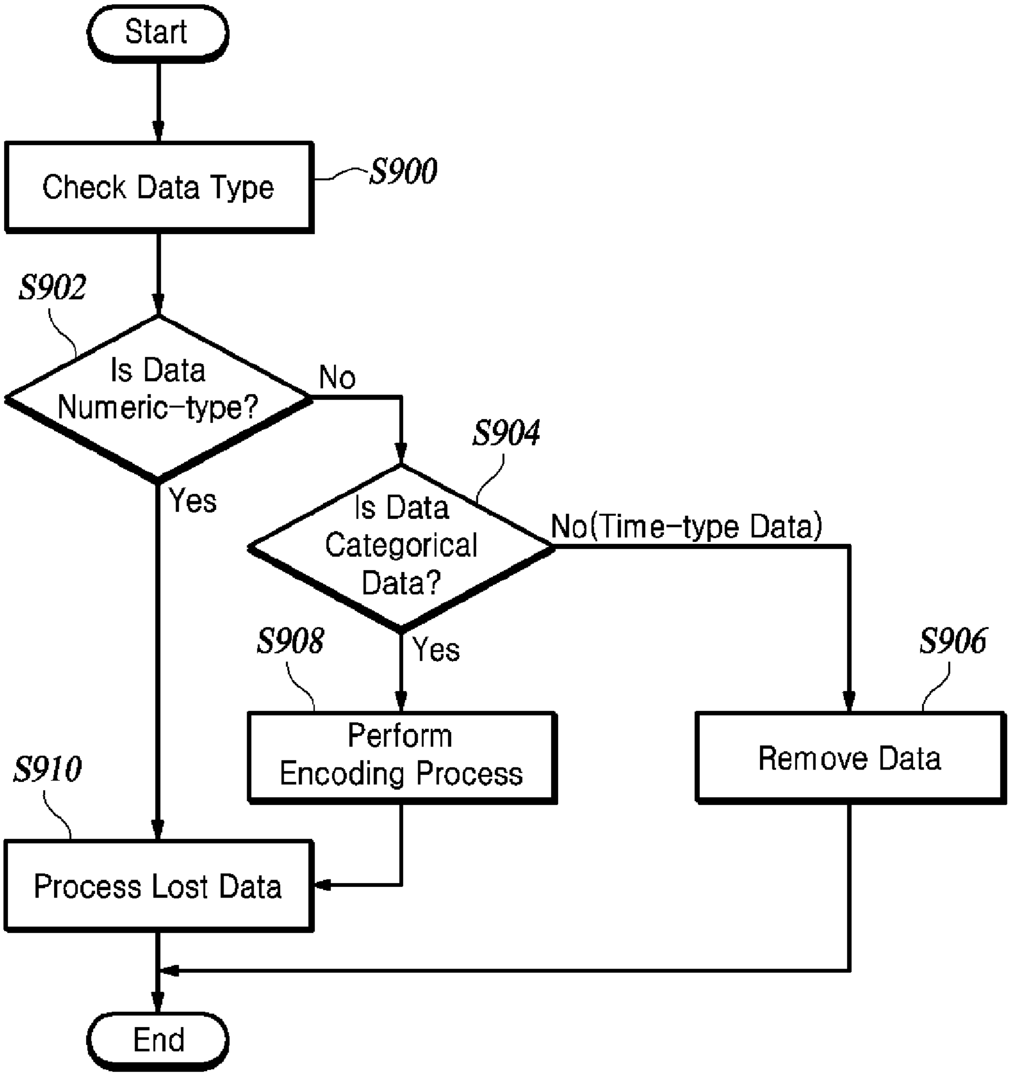
FIG. 9 is a flowchart of a pre-processing process on quality data according to at least one embodiment of the present disclosure.

FIG. 9 is a flowchart of a pre-processing process on quality data according to at least one embodiment of the present disclosure.

The data pre-processing unit 104 checks the data type of the process factor (S900).

The data pre-processing unit 104 checks whether the data type is numeric-type data (S902), and if not, checks whether it is categorical data (S904).

The data pre-processing unit 104 removes time-type data, not numeric-type/categorical data (S906). The time the quality data is collected is considered as having little correlation with the okay or no good quality of the product, so the time-type process factor is removed from the quality data for learning.

With categorical data, the data pre-processing unit 104 performs an encoding process of converting the same data into an embedding value suitable for an inference model (S908).

As an example of categorical data, there may be a target factor indicating whether or not a field claim has occurred against the product. For example, the encoding process of the target factor indicates no occurrence of a field claim against the product as 0 and the occurrence of a field claim as 1. Accordingly, encoding of such a target factor may be a process of generating a learning label for training the inference model.

In response to the numeric-type data and the encoded categorical data, the data pre-processing unit 104 processes the lost data that occurred in the collection process (S910). In this case, the categorical data may be set as a mode value, and the numeric-type data may be set as a median value. Meanwhile, a process factor with significant lost data, if used in training the inference model, may interfere with the training. Accordingly, the data pre-processing unit 104 may remove a process factor whose missing rate is greater than a preset ratio (e.g., 80%) in the training process.

The number of process factors included in the quality data may be tens to hundreds depending on the target product. The process factor selection unit 806 selects main process factors having a high influence on the target factor from the multiple process factors included in the quality data. Using the selected main process factors can reduce the complexity of the inference model and the time required for learning.

Figure 10:
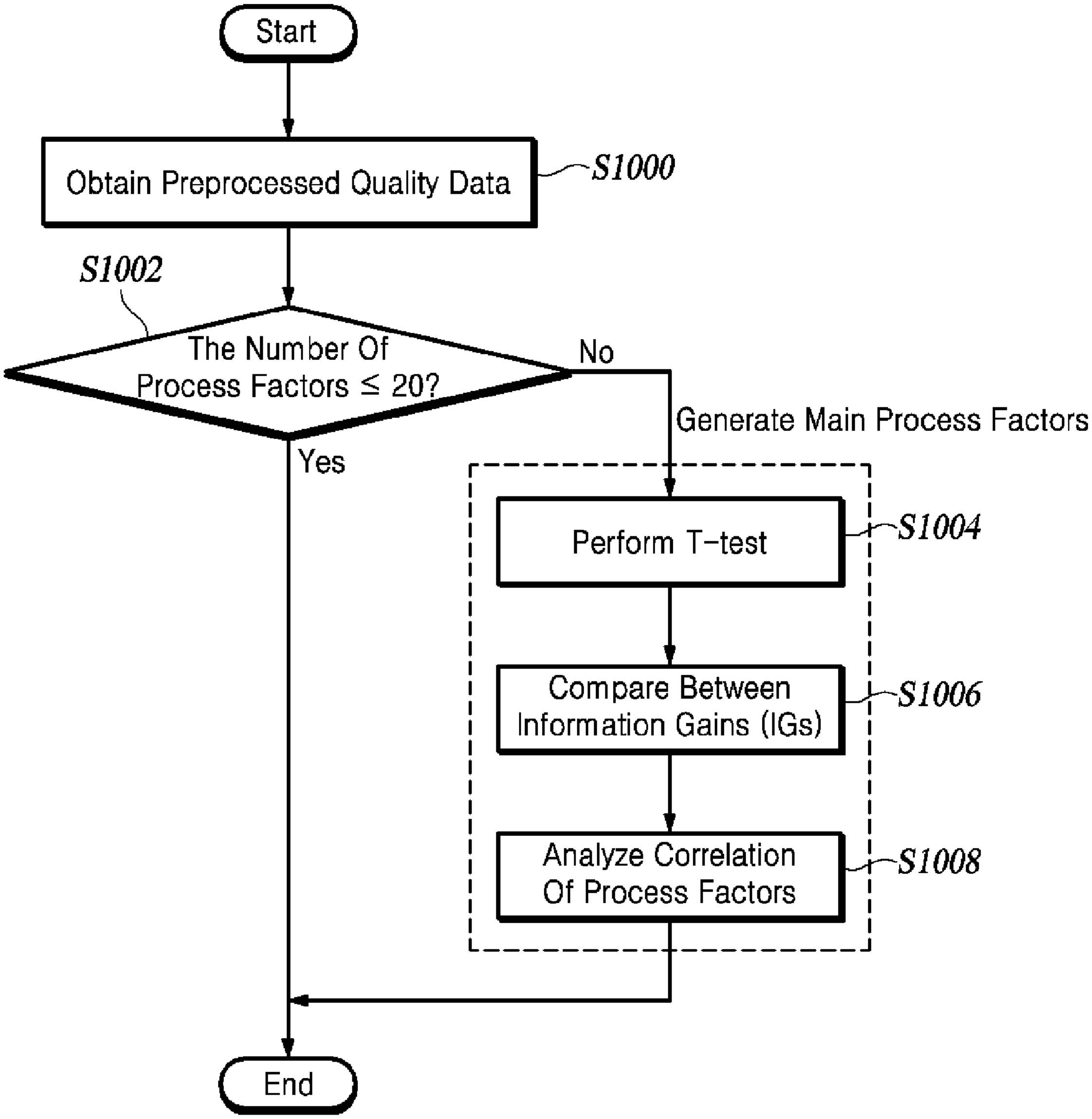
FIG. 10 is a flowchart of a process factor selection process according to at least one embodiment of the present disclosure.

FIG. 10 is a flowchart of a process factor selection process according to at least one embodiment of the present disclosure.

The process factor selection unit 806 obtains quality data preprocessed by the data preprocessing unit 104 (S1000).

The process factor selection unit 806 checks whether the number of process factors is less than or equal to a preset number that is 20 in the example of FIG. 10 (S1002). When the number of process factors is less than or equal to the preset number, the process factor selection unit 806 may skip the process factor selection process.

When the number of process factors is greater than the preset number, the process factor selection unit 806 may perform Steps S1004 to S1008 for yielding the main process factors and select the main process factors to be less than or equal to the preset number.

First, the process factor selection unit 806 performs a T-test on the process factors included in the quality data (S1004).

Here, the T-test is a method of confirming statistical significance by comparing two distributions of okay and no good qualities of the product for each process factor. When the difference is significant between the two distributions, the process factor selection unit 806 determines that the relevant process factor may affect the occurrence of defects and selects the same process factor as the main process factor.

The process factor selection unit 806, when the number of process factors that have passed the T-test is less than or equal to a preset number, may skip the remaining steps S1006 and S1008 and select the process factors that have passed the T-test as the main process factors finally.

The process factor selection unit 806 compares between the information gains of the process factors that have passed the T-Test (S1006). A preset number, e.g., 20 of process factors may be selected in the order of their information gains from being high to low. Here, as described above, the information gain may be generated by subtracting, from information on the okay or no good quality of the product, the information on the okay or no good quality after branching by one process factor.

The process factor selection unit 806 analyzes the correlation between the process factors selected in the order of their information gains (S1008). As described above, since the process factor may be an input factor, a mid-process output factor, or an output factor of a product production process, a correlation may exist between the process factors selected in the order of their information gains from being high to low. At this time, among the multiple process factors, the correlation between the two process factors is expressed by a correlation coefficient which is a value obtained by dividing the covariance of the two process factors by the product of the standard deviations of the two process factors. Meanwhile, the correlation coefficient may be expressed on a heatmap in the form of a matrix.

The process factor selection unit 806 analyzes the correlation between the selected process factors and identifies a case where the correlation coefficient is greater than a preset reference value. The process factor selection unit 806 removes one of the two process factors whose correlation coefficient is greater than the preset reference value, in the order as listed, an output factor, a mid-process output factor, and an input factor. For example, when two process factors having a correlation are an output factor and an input factor, respectively, process factor selection unit 806 removes the output factor. Meanwhile, when two process factors whose correlation coefficient is greater than a preset reference value are the same type, the process factor selection unit 806 selects the process factor having a higher information gain.

By using the method for process factor selection based on the correlation, the process factor selection unit 806 may remove multicollinearity existing between the process factors.

Meanwhile, when the number of selected process factors gets below the preset number due to the removal of the process factors based on the correlation analysis, the process factor selection unit 806 may additionally select process factors in the order of their information gains from being high to low.

Based on the above-described T-test, information gain comparison, and correlation analysis, the process factor selection unit 806 may select the final main process factors.

Meanwhile, quality data may generally have an imbalance state with a relatively small amount of NG data compared to okay data. For example, some products have serious ratios of one NG data to thousands of okay data. Since this imbalanced state may induce biased learning of the machine learning algorithm-based model, data balancing may be needed to be performed based on the augmentation of NG data.

The data balancing unit 808 performs data balancing on NG data. The data balancing unit 808 upsamples the NG data to increase the number of NG data, thereby achieving a balance between the NG data and the okay data. For example, the data balancing unit 808 may generate similar data within a data distribution by using a k Nearest Neighbors (kNN) model technique.

Here, the kNN model technique new data given for examining neighboring k data items for new data and then classifying it into a category containing more data. Accordingly, the data balancing unit 808 may generate new data in the neighborhood including the majority of NG data among the k data items and thereby augment the number of NG data.

After performing pre-processing, main process factor selection, and balancing on the quality data, the training unit 112 trains, as described above, the four machine learning models 810 that are based on the decision tree, random forest, XGBoost, and LightGBM algorithms, and thereafter elect one machine learning model with the best performance as the inference model.

First, the training unit 112 divides the balanced quality data into data for learning and data for verification. For example, 80% of quality data may be used as training data or data for learning, and the remaining 20% of quality data may be used as data for verification.

The training unit 112 performs training on the four machine learning models 810 based on the data for learning and the label for learning. Since each model is implemented based on a decision tree, training can be performed toward maximizing the information gain at each branch in the tree.

The training unit 112 performs cross-validation on the four machine learning models 810 based on the data for verification and stores the trained performance of the four machine learning models 810.

For training, hyperparameters are used including, for example, a max-depth, a leaf-limit, etc., wherein the max-depth represents the maximum value of a tree branch, and the leaf-limit represents the limit value of the leaf.

In particular, the training unit 112 focuses on preventing overfitting by appropriately adjusting the maximum depth in the training process on the four models 810.

Upon completion of the training of the four models 810, the training unit 112 compares the performances of the four models 810 and selects an inference model. The performance of the learned model includes, as illustrated in FIG. 6, an accuracy, precision, recall, and F1 score based on a label for learning, and determinations that the respective machine learning models generate. Additionally, the performance of the learned model may include runtime, which is the time required for learning.

The training unit 112 selects the model having the highest F1 score as the final inference model. However, when selecting the final model, the user can choose to use the recall as the selection criterion if the goal is to reduce NG products and use the precision as the selection criterion if the goal is to reduce false NG products.

Figure 11:
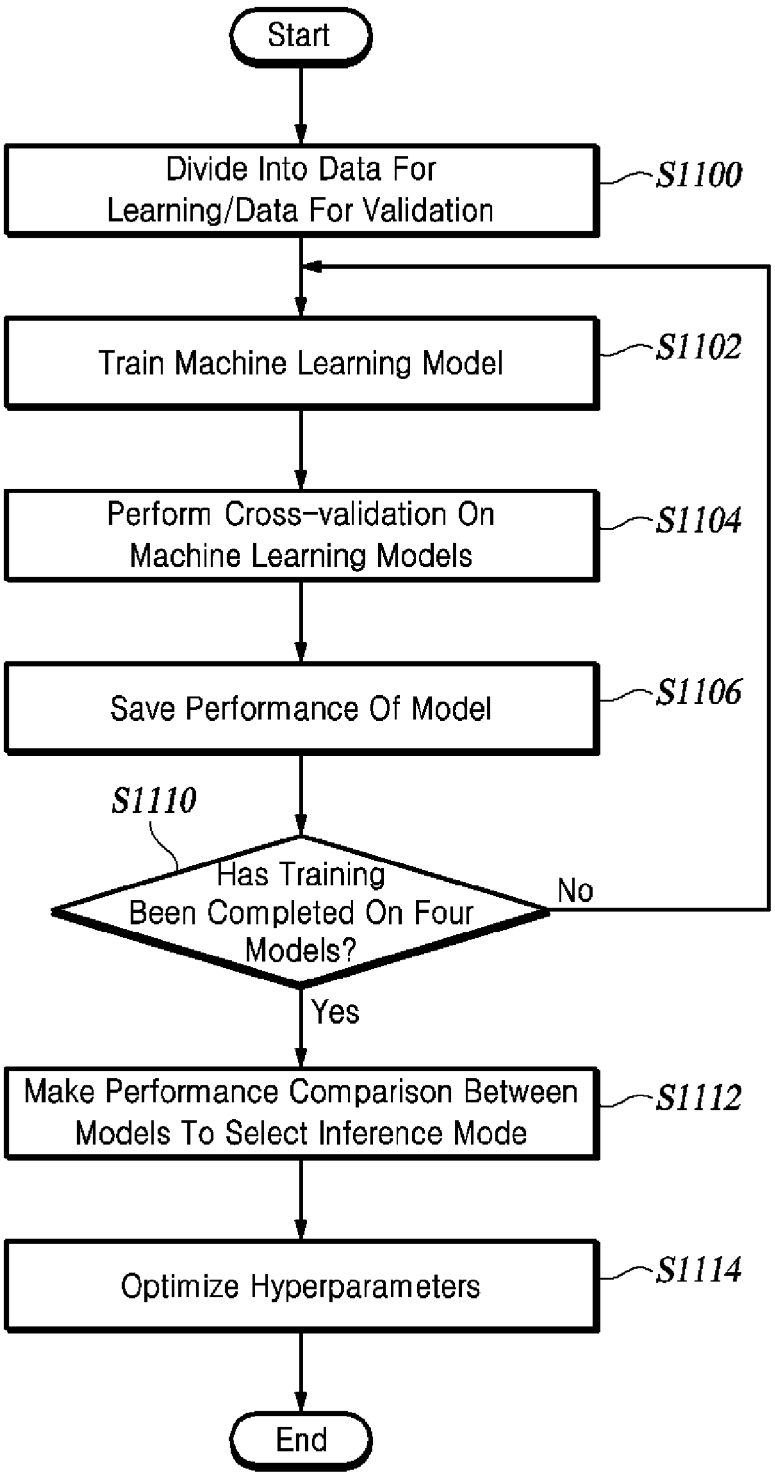
FIG. 11 is a flowchart of a training process for a machine learning model according to another embodiment of the present disclosure.

FIG. 11 is a flowchart of a training process for a machine learning model according to another embodiment of the present disclosure.

The training unit 112 divides the balanced quality data into data for learning and data for verification (S1100).

The training unit 112 performs training on one machine learning model based on the data for learning and the label for learning (S1102). Since the models are each implemented based on a decision tree, the training can be performed toward maximizing the information gain at each branch in the tree.

The training unit 112 first performs cross-validation on the learned machine learning model based on the data for verification (S1104) and then saves the performance of the model as a training result (S1106).

In training a machine learning model, one of the important considerations is a trade-off between the required learning time and the achieved model performance. For the field operator who is not proficient in data analysis to use the analysis system 100, it may be appropriate to manage the required learning time to be within 2-3 hours, so the same amount of learning time may be used as a criterion in the trade-off process. To satisfy this learning time criterion, the present disclosure may use a method for optimal model selection by performing training once for each of the machine learning models based on preset hyperparameters suitable for quality data, performing cross-validation over the four machine learning models 810, and comparing between the model performances to elect the optimal performance model.

For optimization, it is conventionally thought that only after adjusting the hyperparameters for each of the models, performance comparisons are made between the models to select the optimal one. However, the present disclosure in some embodiment pre-adjusts the hyperparameters to empirically appropriate values to suit the imbalance characteristic of the quality data, which enables a one-time training session and the subsequent cross-validation to compare the model performances, thereby minimizing the learning time required by the model.

The training unit 112 particularly focuses on preventing overfitting by appropriately setting the maximum depth in the training process on the four models 810.

The training unit 112 checks whether training has been completed on the four models 810 (S1110), and when an untrained model remains, it continues to train and verify those models (S1102 to S1106).

Upon completion of the training of the four models 810, the training unit 112 compares the performances of the four models and selects an inference model (S1112).

The training unit 112 selects the model having the highest F1 score as the final inference model. However, when selecting the final model, the user may achieve the goal of reducing NG products by using the recall as the selection criterion and the goal of reducing false NG products by using precision as the selection criterion.

The training unit 112 performs the hyperparameter optimization on the selected inference model (S1114).

For the inference model trained by using the method described above for reducing the required learning time, the training unit 112 adjusts the hyperparameters within appropriate ranges to improve the model performance. A typical method for hyperparameter adjustment is to use a grid search, but having to do the performance check for all the possible hyperparameter settings undesirably prolongs the time required.

To improve this deficiency, the training unit 112 according to at least one embodiment adjusts hyperparameters based on a random search. The random search randomly sets hyperparameters and checks the performance of the inference model with the random hyperparameter setting and model performance checking performed as many times as set in advance. The training unit 112 may optimize the hyperparameter by finding the best-case hyperparameters over other parameters in terms of model performance.

In another embodiment of the present disclosure, the training unit 112 performs the random search a preset number of times, wherein it determines whether the inference model with some hyperparameters satisfies a preset performance, and if yes, it may select the same hyperparameters as optimal hyperparameters and terminate the random search.

As described above, the present embodiment applies the hyperparameter optimization exclusively to the inference model and performs the optimization based on the random search, thereby reducing the learning time of the inference model to a minimum.

Although not shown, the device to be installed with the analysis system 100 according to the present embodiment may be a programmable computer, and it includes at least one communication interface that can be linked with a server (not shown).

Training as described above on the inference model may be performed by the device installed with the analysis system 100 and using the device's computing power.

Training as described above on the inference model may be performed by the server. The server may have its training unit perform training on a machine learning model having the same structure as the inference model that is a component of the analysis system 100 installed in the device. Using a communication interface linked with the device, the server may transmit the parameters of the trained machine learning model to the device, when the analysis system 100 may use the received parameters to set the parameters of the inference model. Further, at the time when the analysis system 100 is installed in the device, parameters of the inference model may be set.

Figure 12:
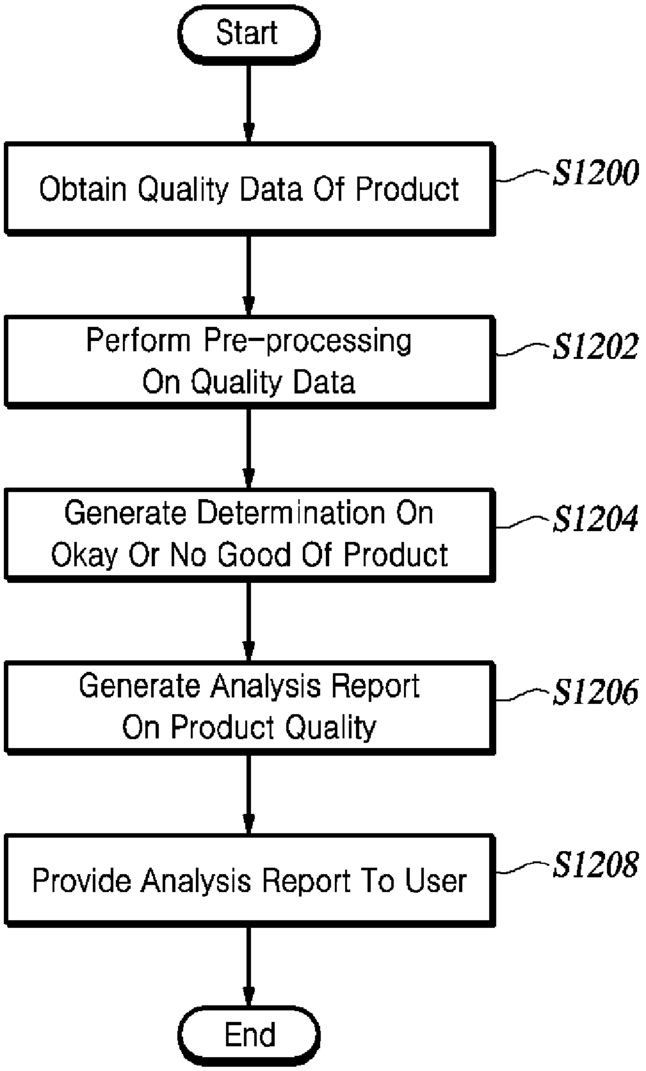
FIG. 12 is a flowchart of a quality data analysis method according to at least one embodiment of the present disclosure.

FIG. 12 is a flowchart of a quality data analysis method according to at least one embodiment of the present disclosure.

The analysis system 100 obtains quality data of the product (S1200). The quality data may be collected concerning a plurality of process factors applied to or generated in the production process of the product. The process factors inputted for quality data analysis may be the main process factors selected in the pre-training process on the inference model.

The analysis system 100 may set a data type such as a categorical type or a numeric type of process factor used as an input to an inference model. In this case, the analysis system 100 may obtain an input, e.g., quality data, type of process factor, etc. required for analysis from the user through the UI unit 110.

Meanwhile, the analysis system 100 sets, as a target factor, the process factor used as a target output.

The analysis system 100 performs a pre-processing process on the quality data (S1202).

An encoding process may be performed for converting categorical process factors into embedding values suitable for the inference model.

An example of categorical data may include a target factor indicating whether or not a field claim has occurred against a product. Accordingly, encoding for such a target factor may be a process of generating a label for analysis for quality analysis based on an inference model.

Additionally, the analysis system 100 may set the value of the process factor lost in the data collection process. For example, a numeric-type process factor may be set as a median value, and a categorical process factor may be set as a mode value.

The analysis system 100 uses the inference model for generating a determination as to whether the product is okay or no good based on a plurality of pre-processed process factors (S1204). Here, the determination may be a probability value of okay or no good quality of the product.

The inference model may be implemented in the form of a machine learning model, and it may be a model that is an implementation of one of four machine learning algorithms such as the tree-based decision tree, random forest, XGBoost, and LightGBM. Using the training process, the training unit 112 may select, as the inference model, a model with the best performance among the models to which the four machine learning algorithms are applied, respectively.

The analysis system 100 generates an analysis report on the quality of the product based on the plurality of process factors, the label for analysis, and the determination (S1206). To comprehensively/microscopically represent the effect of each process factor on the determination (okay or no good quality of the product), the analysis report may contain all or some of the analysis data summary 202, process factor importance 204, data distribution by process factor 206, and analysis result 208.

The analysis system 100 provides the analysis report to the user through the UI unit 110 (S1208).

Figure 13:
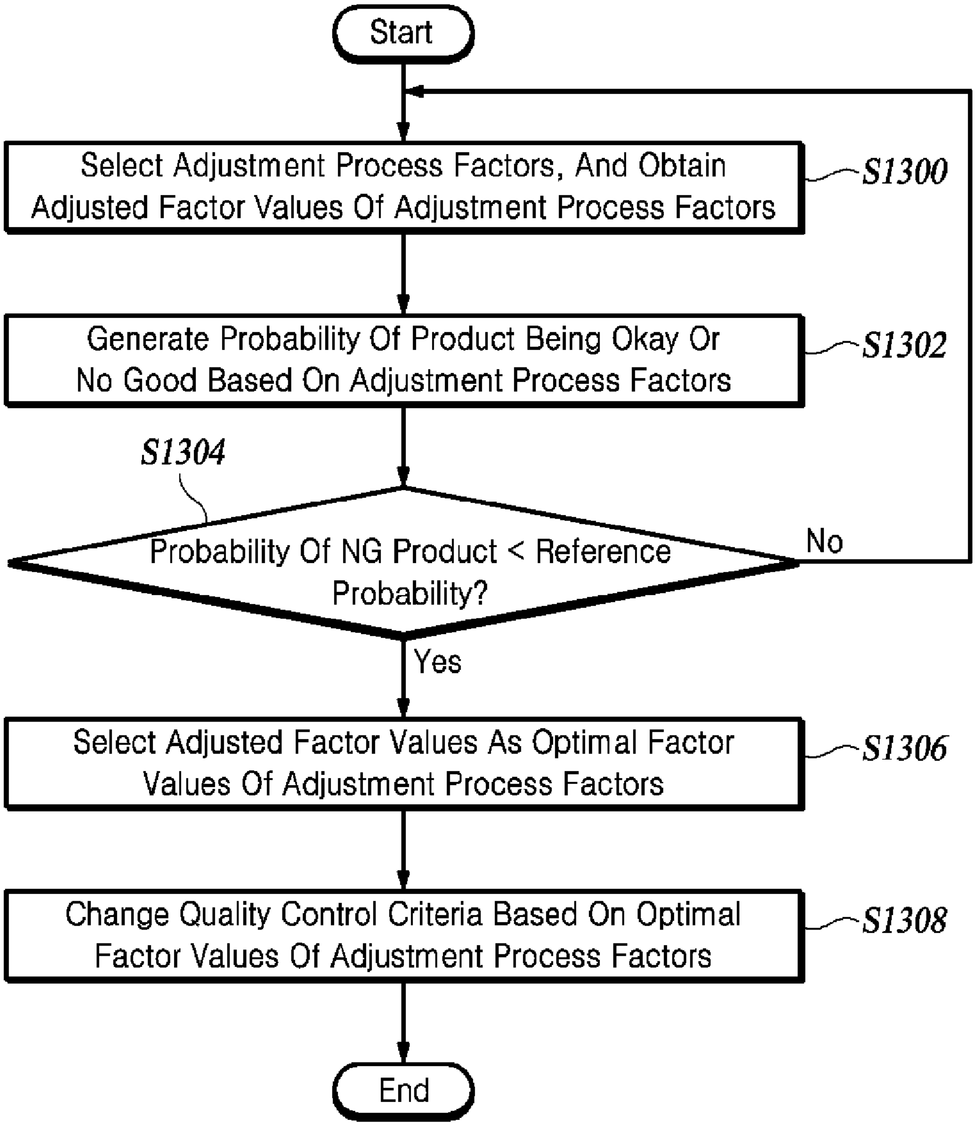
FIG. 13 is a flowchart of a method of revising the quality control criteria based on a simulator according to at least one embodiment of the present disclosure.

FIG. 13 is a flowchart of a method of revising the quality control criteria based on a simulator according to at least one embodiment of the present disclosure.

The simulator selects adjustment process factors and obtains adjusted factor values of the adjustment process factors (S1300). The simulator may use the UI unit 110 as illustrated in FIG. 7 to first select the adjustment process factors and then obtain adjusted factor values from the user.

Checkboxes may be used to select the adjustment process factors. With the process factors whose checkbox is selected, the process factor values may be adjusted according to the data type.

Where the selected adjustment process factors are categorical process factors, a category of the process factor values desired by the user may be selected by using checkboxes. With numeric-type process factors, the user may use a slider to adjust the process factor values.

Additionally, concerning the T-test result for the process factors, the relevant process factor values may be adjusted to minimize the distribution of product defects.

The adjustment process factors may be all or part of the main process factors selected in the pre-training process for the inference model.

Additionally, as the adjustment process factors, the input factors as described above may be selected.

The simulator uses an inference model to generate a probability of the product being okay or no good based on the adjustment process factors (S1302). As described above, the determination generated by the inference model may be a probability value of the product having the okay or no good quality.

The inference model is implemented in the form of a machine learning model and may be a model that is an implementation of one of four machine learning algorithms such as the tree-based decision tree, random forest, XGBoost, and LightGBM. Using the training process, the training unit 112 may select, as an inference model, the model with the best performance among models to which the four machine learning algorithms are applied, respectively.

The simulator checks whether the probability of the product being no good is less than a preset reference probability (S1304). When the probability of being an NG product is equal to or greater than the reference probability, the simulator newly obtains adjusted factor values and performs the simulation steps of S1302 and S1304 over again.

When the probability of being an NG product is less than the reference probability, the simulator selects the adjusted factor values as the optimal factor values of the adjustment process factors (S1306).

The simulator changes the quality control criteria for the adjustment process factors based on the optimal factor values (S1308). The changed quality control criteria apply to the production process for the coming products.

Figure 14:
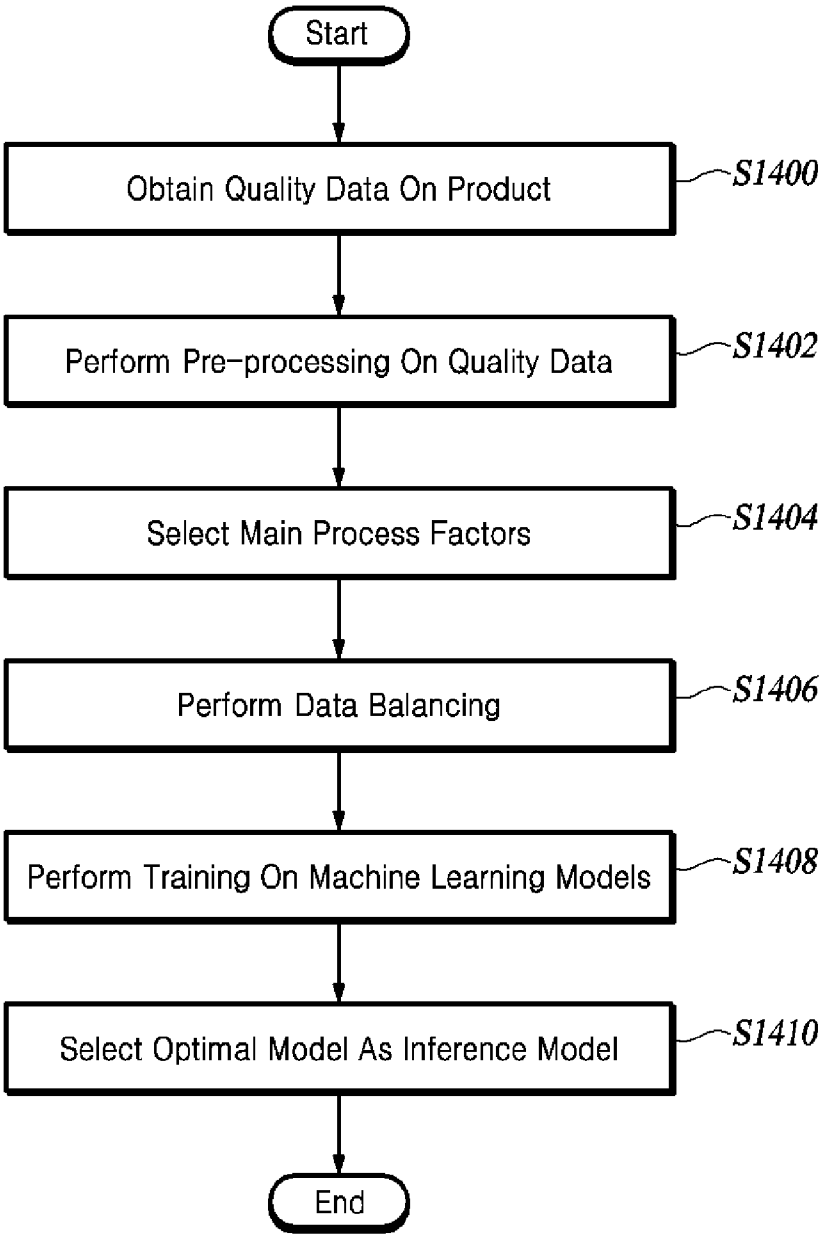
FIG. 14 is a flowchart of a method of training an inference model according to at least one embodiment of the present disclosure.

FIG. 14 is a flowchart of a method of training an inference model according to at least one embodiment of the present disclosure.

The training unit 112 obtains quality data on a product to use the same for training the inference model (S1400). Quality data may be collected for a plurality of process factors applied to or generated in the production process of the product.

The training unit 112 may set a data type for process factors used for training.

Meanwhile, the quality data may include factors (e.g., whether or not a field claim is generated against the product) that can be used as a target output, i.e., a label for learning in the training process of the inference model. The training unit 112 sets a factor used as a target output as a target factor.

The category the process factors and the target factor may be set by using the UI unit 110, as described above.

The training unit 112 performs a pre-processing process on the quality data (S1402).

The training unit 112 may perform an encoding process of converting categorical process factors into embedding values suitable for the inference model. Additionally, the training unit 112 may set the value of the process factor lost in the data collection process. For example, a numeric-type process factor may be set to a median value, and a categorical process factor may be set to a mode value.

Encoding of the target factor, which is categorical data, may be a process of generating a learning label for training the inference model.

The training unit 112 selects the main process factor having a strong influence on the target factor from among a plurality of process factors included in the quality data (S1404).

When the number of process factors is greater than a preset number, the training unit 112 may perform the process of yielding the main process factors as described above and select the main process factors to be less than or equal to the preset number. The process of yielding the main process factors may include performing all or some of a T-test, comparison between information gains, and correlation analysis.

The training unit 112 puts the main process factors to undergo the data balancing on NG data (S1406). The training unit 112 upsamples the NG data to augment the number of NG data items, thereby achieving a balance between the NG data and the okay data.

The training unit 112 performs training on the four machine learning models 810 (S1408).

The training unit 112 divides the balanced quality data into data for learning and data for verification and then uses those divided data as a basis for training each of the four machine learning models 810. Additionally, the training unit 112 performs cross-validation on the learned machine learning models based on the data for verification and then stores the performances of the respective models.

The training unit 112 may focus on preventing overfitting by appropriately adjusting the maximum depth in the training process on the four models 810.

Upon completion of the training of the four models 810, the training unit 112 compares the performances of the four models 810 and selects an optimal model as an inference model (S1410). The training unit 112 may select a model having the highest F1 score as the final inference model.

The analysis system 100 according to the present embodiment uses a method of improving the quality control criteria for the process factors to solve the problem of bias of the process factors included in the quality data.

Figure 15:
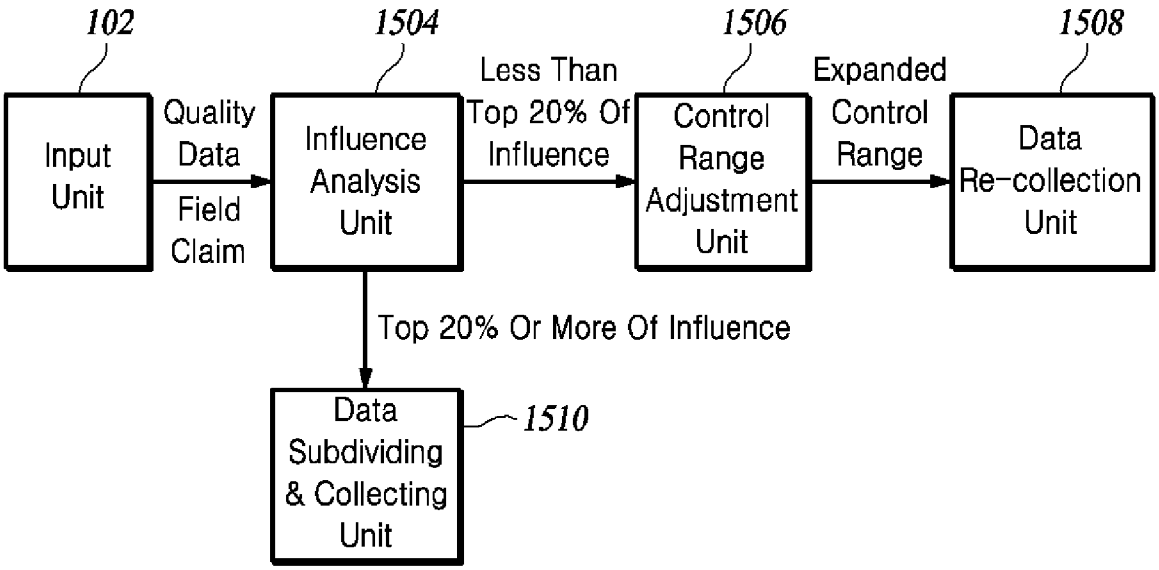
FIG. 15 is a schematic diagram of the configuration of an apparatus for improving quality control criteria for process factors according to at least one embodiment of the present disclosure.
Figure 16:
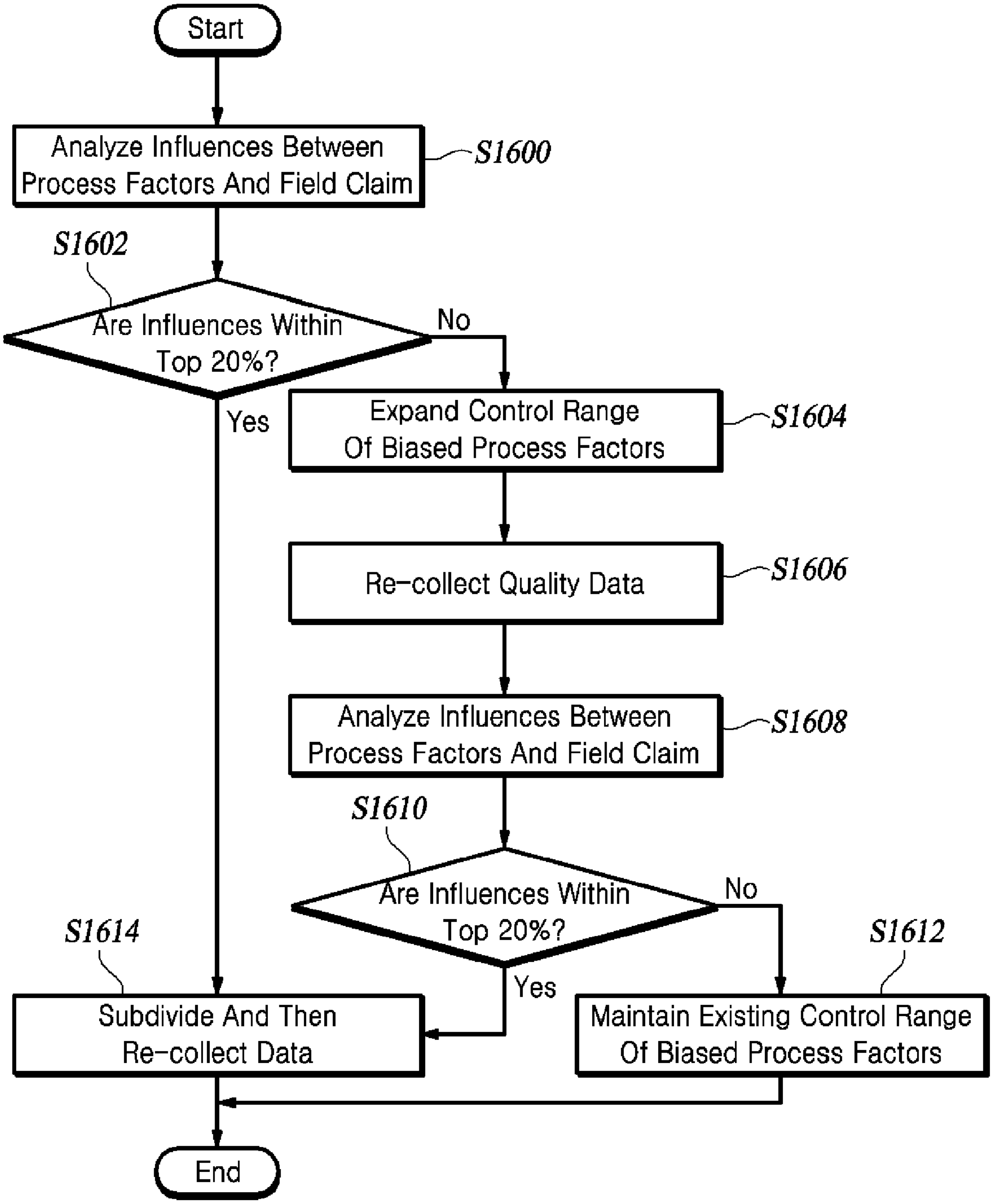
FIG. 16 is a flowchart of a method of improving the quality control criteria on process factors according to at least one embodiment of the present disclosure.

The following describes a method performed by the analysis system 100 for improving the quality control criteria for process factors referring to FIGS. 15 and 16.

FIG. 15 is a schematic diagram of the configuration of an apparatus for improving the quality control criteria for process factors according to at least one embodiment of the present disclosure.

The apparatus for improving the quality control criteria according to some embodiments is included in the analysis system 100 and operates based on the influences between the process factors and the field claim on a product (hereinafter, 'influence') for adjusting quality control criteria for less influential process factors. The apparatus for improving the quality control criteria may include all or some of an input unit 102, an influence analysis unit 1504 (may also be referred to as process influence analyzer 1504), a control range adjustment unit 1506 (may also be referred to as control range adjuster 1506), a data re-collection unit 1508 (may also be referred to as data re-collector 1508), and a data subdividing & collecting unit 1510 (may also be referred to as data subdivider & collector 1510).

The input unit 102 obtains quality data and field claims on the product. The quality data may be collected concerning a plurality of process factors applied to or generated in the production process of a product. Here, the field claim may indicate the okay or no good quality of the product, and it may be set as a target feature for future training.

The influence analysis unit 1504 analyzes the influences between the process factors and the field claim included in the quality data. Methods of analyzing the degree of influence may be the above-described methods used in the process of selecting main process factors, e.g., T-test, calculation of information gain, correlation analysis, etc. Based on this influence analysis, the influence analysis unit 1504 may arrange the process factors in the order of their impacts from being strong to weak.

The influence analysis unit 1504 utilizes the T-test to select the process factors having a statistical significance on the okay or no good quality of the product. The influence analysis unit 1504 may compare between information gains of the selected process factors and generate an array of process factors arranged in order from the higher information-gain process factor to the lower information-gain process factor. The influence analysis unit 1504 analyzes the correlation between the arranged process factors, and it removes one of the two process factors having a correlation coefficient greater than a preset reference value, e.g., a process factor with the lower information gain out of the process factor array. This removal is performed because, if the control range is adjusted for both process factors with high correlation, conflicting adjustment results may occur. Accordingly, the order by influence may be the order from the higher information gain to lower information gain with the statistical significance and correlation reflected.

The control range adjustment unit 1506 expands the control range of the biased process factors whose influences do not fall within the top 20%. To expand the control range of the biased process factors, the analysis system 100 may expand the range of data collected in the production process by further lowering the lower limit of the existing control range or raising the upper limit higher.

The data re-collection unit 1508 re-collects quality data based on the expanded control range. Using a storage device included in the analysis system 100 or the server, the data re-collection unit 1508 may re-collect and store the quality data. Depending on the nature of the production process or process factors, this re-collection process may take days, weeks, months, or longer.

Meanwhile, after the control range is adjusted, the influence analysis unit 1504 may analyze the influences between the process factors and the field claim included in the re-collected quality data. Based on the influence analysis, process factors may be rearranged in the order of their influences being from strong to weak. Using the re-collected quality data, the influence analysis unit 1504 identifies biased process factors whose influences do not fall within the top 20%, and the influence analysis unit 1504 may maintain the existing control range on those biased process factors.

Using the input quality data or the re-collected quality data, the data subdividing & collecting unit 1510 identifies the process factors whose influences fall within the top 20% and subdivides the data within the control range and then re-collects the data subdivisions concerning those strongly influential process factors. Subdividing and re-collecting of the data within the control range render the quality data to present evenly within the control range.

FIG. 16 is a flowchart of a method of improving the quality control criteria on process factors according to at least one embodiment of the present disclosure.

The analysis system 100 analyzes the influences between the process factors and the field claim included in the quality data (S1600). Available methods of analyzing the influence may be the above-described methods used in the process of selecting main process factors, e.g., T-test, calculation of information gain, correlation analysis, etc. Based on the influence analysis, the analysis system 100 may arrange the process factors in the order of their influences from being strong to weak. Here, the order by influence may be the order from the higher information gain to lower information gain with the statistical significance and correlation reflected.

The analysis system 100 checks whether the influences of the process factors are within the top 20% (S1602).

The analysis system 100 expands the control range of the biased process factors whose influences do not fall within 20% (S1604). To expand the control range of the biased process factors, the analysis system 100 may expand the range of data collected in the production process by further lowering the lower limit or raising the upper limit of the existing control range.

The analysis system 100 re-collects quality data based on the expanded control range (S1606). Using a storage device included in the analysis system 100 or the server, the analysis system 100 may re-collect and store the quality data.

With the control range expanded, the analysis system 100 analyzes the influences between the process factor and the field claim on the process factors re-collected (S1608). Based on the influence analysis, the analysis system 100 may rearrange the process factors in the order of their influences from being strong to weak.

The analysis system 100 checks whether the influences of the process factors are within the top 20% (S1610).

The analysis system 100 maintains the existing control range for biased process factors whose influences do not fall within the top 20% (S1612).

The analysis system 100 is responsive once again to the process factors as identified by Steps S1602 and S1610, including the biased process factors with their control range expanded as well as the process factors with their influences falling within the top 20% for subdividing and re-collecting data within the control range (S1614). The subdividing and re-collecting of the data within the control range render the quality data to present evenly within the control range.

As described above, the present disclosure in some embodiments provides an analysis system that subdivides and then re-collects data within the control range, thereby reducing the effect of the process factors being biased and increasing the efficiency of quality data analysis.

In some embodiments, as described above, the product subject to quality analysis may be a part included in a vehicle, such as a gearbox. Compared to the entire vehicle, which is a complex system, the gearbox is a system of an appropriate size for performing quality analysis based on the analysis system 100 according to the embodiments. In particular, the machine learning-based inference model may use the training process for modeling a causal relationship between a plurality of process factors of the gearbox and a field claim, i.e., okay or no good quality of the product. Then, by using the trained inference model, the present disclosure can adjust the quality control criteria for specific process factors to reduce the defect rate of the gearbox.

On a side note, the process factors constituting the quality data of the gearbox may include, for example, pinion plug nut runner torque, lock ring press-fit depth, pinion grease application amount, lock ring caulking amount, pinion plug LVDT (Linear Variable Displacement Transducer) elevation, caulking load, bearing press-fit depth, rack bar load (Left Hand direction), rack bar load (Right Hand direction), and yoke press-fit load. Since the instantiated embodiments herein are directed to quality analysis of products like a gearbox, the process factors of the gearbox will not be elaborated.

The following describes a case where the analysis system 100 according to some embodiments is applied to the quality analysis of the gearbox.

Figure 17:
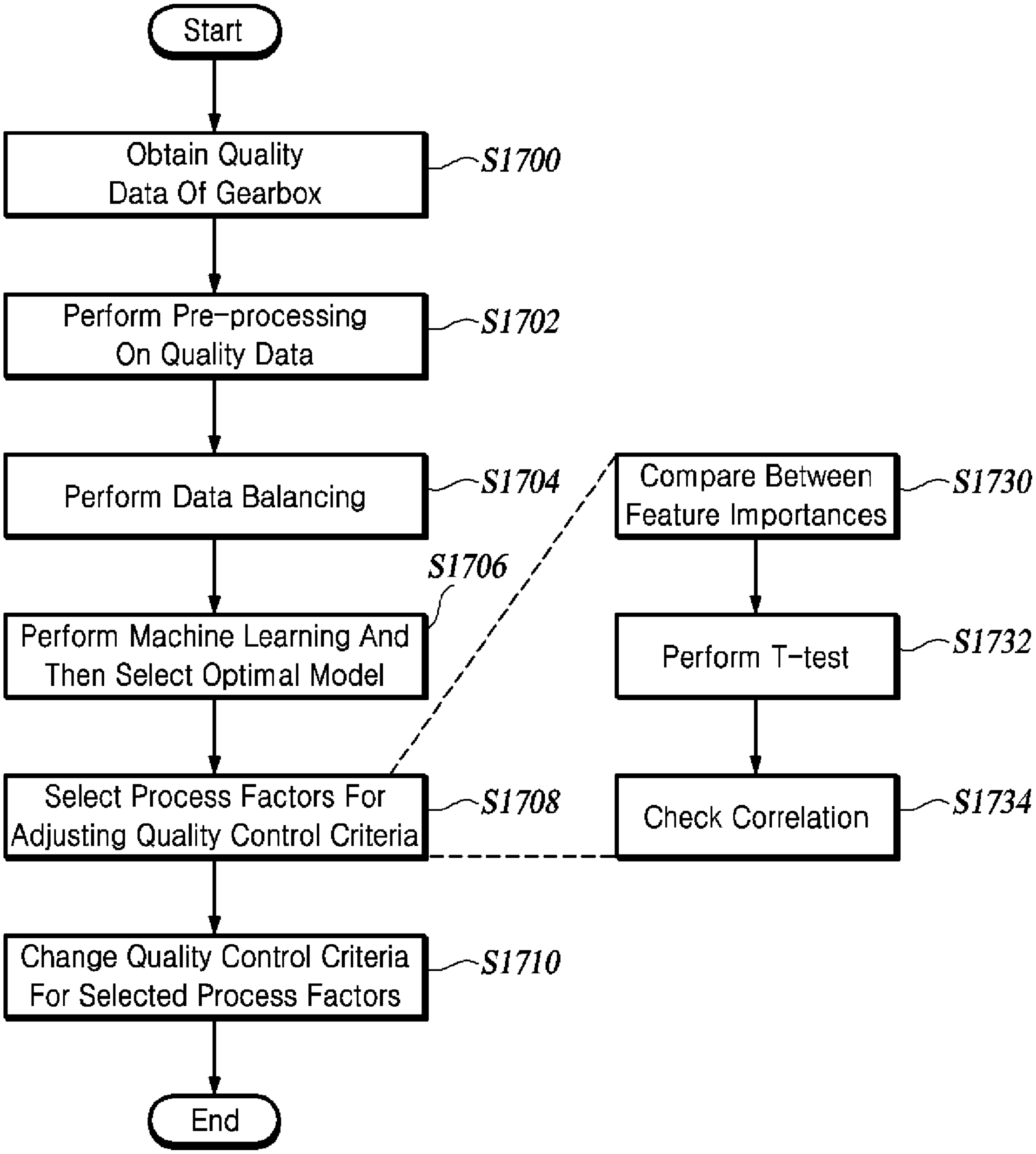
FIG. 17 is a flowchart of a process of applying an analysis system according to at least one embodiment to a gearbox.

FIG. 17 is a flowchart of a process of applying an analysis system according to at least one embodiment to a gearbox.

First, a process of selecting an inference model used for quality analysis of the gearbox will be described.

The analysis system 100 obtains quality data on the gearbox (S1700).

In general, unlike the field claim data managed by the quality system, the process factor data is separately stored and managed by a manufacture executive system (MES), so two data items, the field claim data and the process factor data need to be integrated for quality analysis. Integration may be performed between two data items based on a product identifier (ID) by the name of a gearbox, for which two methods may be used.

The first method is for classifying and integrating process factor data by the type of field claim. The field claims present in the gearbox include vibration, noise, and damage among various others, which may be so classified to be analyzed. The first method has the advantage that detailed cause analysis is possible for each type of field claim but has a shortcoming that the analysis result is biased with small data for each type of field claim.

The second method is for dualizing process factor data first into okay product data and NG product data regardless of the type of field claims and then integrating them. This method advantageously simplifies the task of classifying data, taking less time, and allows universal analysis even with little data for some field claims. In this embodiment, the analysis system 100 obtains the integrated quality data according to the second method, to which, however, the present disclosure is not limited. In another embodiment of the present disclosure, an inference model may be trained to infer an occurrence or absence of a field claim by class.

Then, the integrated quality data may be used for training the inference model, as described above.

The analysis system 100 may set data types for the process factors used for training. Here, the data type of the process factors may include numeric-type process factors expressed as numerical values, categorical process factors expressed as characters, and time-type process factors including information on the time at which data were collected.

Meanwhile, the integrated quality data includes a factor (e.g., the occurrence or absence of a field claim against the gearbox) that can be used as a target output (i.e., a learning label) in the training process of the inference model. The analysis system 100 sets a factor used as a target output as a target factor.

The category and target factor for the process factors may be set by using the UI unit 110, as described above.

The analysis system 100, as illustrated in FIG. 9, performs a pre-processing process on the quality data (S1702).

The time at which the quality data are collected is determined as having little correlation with the okay or no good quality of the product, and the time-type process factor is removed from the quality data for learning.

As for the categorical data, the analysis system 100 performs an encoding process of converting them into embedding values suitable for the inference model.

For example categorical data, there may be a target factor indicating whether or not a field claim has occurred against a product. Encoding of such a target factor is a process of generating a learning label for training the inference model.

As for numeric-type data and encoded categorical data, the analysis system 100 processes to account for data lost during the collection process. In this case, the categorical data may be set as the mode value, and the numeric-type data may be set as the median value. Meanwhile, process factors with significant lost data may interfere with the training of the inference model. Accordingly, the analysis system 100 may remove, from the training process, a process factor whose data missing rate is greater than a preset rate.

Meanwhile, when the number of process factors is greater than 20, the analysis system 100 may perform a process of selecting main process factors for training, as illustrated in FIG. 10. In the example of FIG. 17 related to the gearbox, the process of selecting the main process factors is omitted, exhibiting a case of 20 or fewer process factors constituting the quality data on the gearbox.

The analysis system 100 performs data balancing for process factors (S1704).

The analysis system 100 upsamples the NG data to augment the number of NG data, thereby achieving a balance between the NG data and the okay data. For example, the analysis system 100 may generate similar data within a data distribution by using a kNN model technique.

The analysis system 100 first performs training on the four machine learning models 810 and then selects an optimal model and determines it as the inference model (S1706).

The analysis system 100, as illustrated in FIG. 11, performs training on the four machine learning models 810 by using the gearbox-related quality data and the label for learning, and it selects the inference model based on the training performances of the four machine learning models 810.

In this embodiment, as a result of performing training on the four machine learning models 810, a model implementing the random forest algorithm is selected as the inference model. In the training process, the present embodiment optimizes the hyperparameters around the maximum depth to achieve optimal performance for the inference model.

Meanwhile, commonly used algorithms in recent years are boosting-based algorithms such as XGBoost and LightGBM. However, the nature of quality data with severe data imbalance takes the use of a method of preventing overfitting by adjusting the maximum depth, so a bagging-based algorithm such as the random forest algorithm can produce better results.

The following describes a process of using the inference model for adjusting the process factors of the gearbox.

The analysis system 100 selects the process factors to adjust the quality control criteria (S1708).

The analysis system 100 analyzes the effect of the process factors on the occurrence or absence of a field claim through Steps S1730 to S1734 and selects the process factor with a strong influence.

The analysis system 100 compares the feature importances of the process factors (S1730).

The analysis system 100 compares the feature importances generated in the training process by the inference model that implements the random forest algorithm and firstly selects the process factors.

Figure 18:
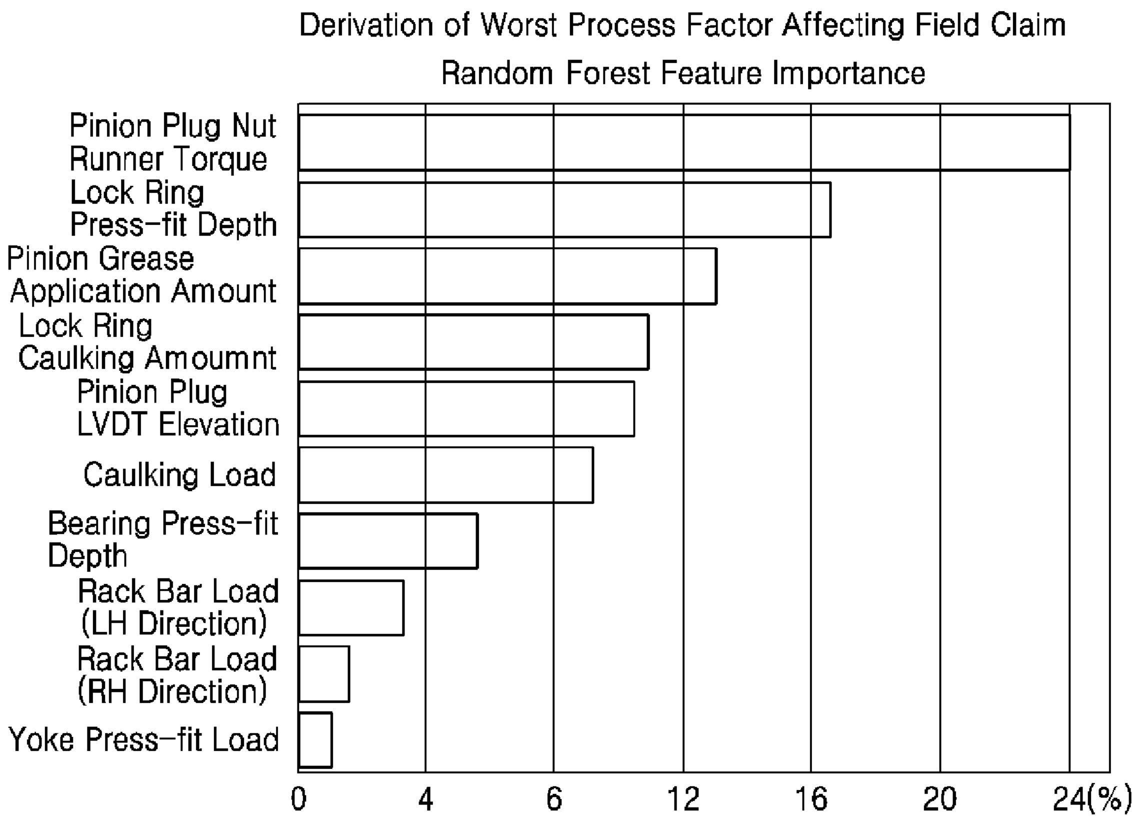
FIG. 18 is a diagram illustrating the feature importances of process factors of the gearbox according to at least one embodiment of the present disclosure.

FIG. 18 is a diagram illustrating the feature importances of process factors of the gearbox according to at least one embodiment of the present disclosure.

In the example of FIG. 18, 'Worst' signifies that the feature importance of the process factor is greater than a preset reference value, and thus it has a strong influence on the generation of field claims. Meanwhile, as described above, these feature importances may be provided to the user via the UI unit 110 as a part of the analysis report.

Back in the process of FIG. 17, the analysis system 100 performs a T-test on the process factors (S1732). The analysis system 100 performs the T-test that verifies the significances of process factors with high feature importance on an okay or no-good quality distribution of the gearbox to secondarily select the process factors.

Figure 19:
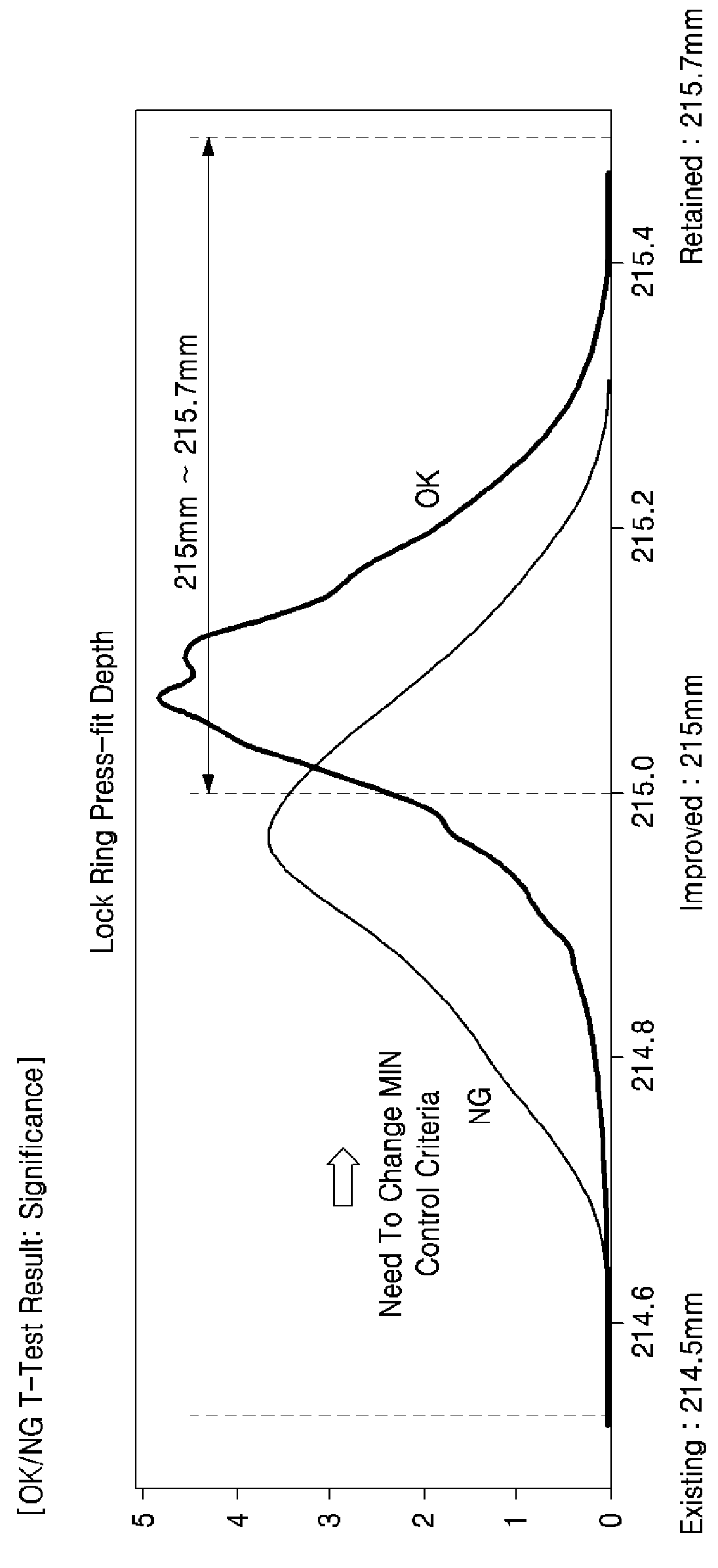
FIG. 19 is a diagram illustrating a T-test according to at least one embodiment of the present disclosure.

FIG. 19 is a diagram illustrating a T-test according to at least one embodiment of the present disclosure.

Here, the example process factor of the gearbox used in the T-test is 'Lock Ring Press-fit Depth', and the test result exhibits significance. Meanwhile, as described above, the data distribution for each of the process factors that are the basis of the T-test may be provided to the user via the UI unit 110 as a part of the analysis report.

The analysis system 100 checks the correlation to the process factors (S1734).

The analysis system 100 checks the correlation between the process factors that have passed over the T-test, and when the correlation coefficient between the two process factors is greater than a preset reference value, it selects a process factor with high feature importance.

In conclusion, the process factors illustrated in FIG. 18 represent those determined to have a strong influence on the occurrence of defects in the gearbox according to the above-described influence analysis. And all of these are the process factors, i.e., input factors that can be adjusted.

The analysis system 100 changes the quality control criteria for the selected process factors (S1710).

Based on the distribution of process factors, the quality control criteria may be changed to minimize the distribution of defects in the gearbox within an adjustable control range. In this case, the distribution of process factors can be used to change the quality control criteria after the parameters defining the distribution are estimated in advance.

Table 1 shows the process factors of the gearbox before and after the change of quality control criterion.

TABLE 1

| Items | Process Feature | Quality Control Criteria | |
|---|---|---|---|
| | | Before Change | After Change |
| Worst1 | Pinion Plug Nut Runner Torque | 6.2~8.2 Kpf | 9.2~12.2 Kpf |
| Worst2 | Lock Ring Press-fit Depth | 214.5~215.7 mm | 215~215.7 mm |
| Worst3 | Pinion Grease Application Amount | 0.1~0.5 g | 0.24~0.5 g |
| Worst4 | Lock Ring Caulking Amount | 3~5 mm | 3~4.6 mm |
| Worst5 | Pinion Plug LVDT Elevation | 2.4~3.1 mm | 2.4~2.85 mm |
| Worst6 | Caulking Load | 980~1,050 Kpf | 980~1,020 Kpf |
| Worst7 | Bearing Press-fit Depth | 214.5~215.7 mm | 214.5~215 mm |
| Worst8 | Rack Bar Load (LH Direction) | 0~300 Kpf · m | 80~300 Kpf · m |
| Worst9 | Rack Bar Load (RH Direction) | 0~300 Kpf · m | 80~300 Kpf · m |
| Worst10 | Yoke Press- fit Load | 100~300 Kpf | 100~200 Kpf |

For example, based on the T-test result as illustrated in FIG. 19, the quality control criteria may be changed for the lock ring press-fit depth to minimize the distribution of defects in the gearbox.

The analysis system 100 may use the inference model as a simulator to generate a probability value of the okay or no good quality cases of the gearbox under the changed quality control criteria, thereby confirming whether the quality control criteria have been appropriately changed. For example, when the probability of the gearbox defects is equal to or greater than the reference probability, the analysis system 100 can repeatedly check whether the quality control criteria are properly changed by obtaining the quality control criteria and re-generating the determination.

For the process factors shown in Table 1, it was expected that once the quality control criteria after the change are applied to the production process of the gearbox, the defect rate due to the relevant process factors can be reduced by a minimum of 10% to a maximum of 90%. A field trial was conducted on such process factors as the lock ring caulking amount, pinion plug LVDT elevation, and four-point bearing press-fitting depth by applying the changed quality control criteria thereto, resulting in a confirmed reduction of defect rate due to the relevant process factors.

In the above description, the inference model is used for changing the quality control criteria, but the inference model can also be utilized for quality analysis. For example, the same inference model may be utilized to apply new quality control criteria to the production process of the gearbox and then repurposed to confirm the characteristics of the quality data collected in the later production process.

Disclosed above are a quality data analysis system and a quality data analysis method for reducing the time required for quality analysis of a product and reducing the occurrence of product defects and thereby reducing the quality cost, by performing training of a machine learning-based inference model based on quality data on the product, an analysis of quality data based on the inference model to provide an analysis report, and an adjustment of process factors by using the inference model as a simulator.

As described above, according to some embodiments, a quality data analysis system and method are provided, which train a machine learning-based inference model based on accumulated quality data on a product and provide an analysis report by analyzing the collected quality data based on the inference model, thereby reducing the quality cost thanks to the reduction of the time required for quality analysis of the product.

Additionally, according to some embodiments, a quality data analysis system and method are provided, which adjust process factors by using an inference model as a simulator, thereby reducing the occurrence of product defects.

Further, according to some embodiments, a quality data analysis system and method are provided, which analyze the collected quality data based on an inference model to provide an analysis report and use the inference model as a simulator to adjust the process factors of products, establishing a Machine Learning as a Service (MLaaS) environment for allowing field managers who are not data analysis experts to perform quality analysis on the products and enabling field-led quality data management and analysis.

Additionally, according to this embodiment, a quality data analysis system and method are provided, which accumulate quality data by resolving process factor bias based on the improvement of quality control criteria, thereby reducing the imbalance of quality data and increasing the efficiency of analyzing quality data.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method for analyzing quality data. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating a machine learning-based inference model that is trained in accumulated quality data for a product, the method operating the inference model to analyze quality data and as a simulator for adjusting a quality control standard for the product, the method comprising:

manufacturing the product and testing the manufactured product to generate the quality data;

analyzing the quality data with the inference model to generate an analysis report;

receiving, via a user interface (UI) of the simulator, a user's selection of a plurality of adjustment process factors from a plurality of main process factors selected for a machine learning training for the inference model;

obtaining a plurality of adjustment factor values for the selected adjustment process factors;

generating, using a simulator mode of the inference model, a determination based on the adjustment process factors, wherein the determination indicates a probability of the product being of acceptable or unacceptable quality;

comparing the probability of the determination to a reference probability condition;

repeating obtaining the adjustment factor values, generating the determination, and comparing the probability of the determination to the reference probability condition;

when the probability of the determination meets the reference probability condition, selecting corresponding adjustment factor values as optimal factor values for the adjustment process factors; and changing, based on the optimal factor values, the quality control standard for the adjustment process factors used by the inference model for analyzing quality data for the product to confirm acceptable product quality during subsequent manufacturing of the product.

2. The method of claim 1, further comprising outputting, via the UI, the generated determination.

3. The method of claim 1, wherein obtaining the adjustment factor values comprises:

receiving, via the UI, the user's selection of the adjustment process factors using a plurality of first checkboxes displayed on the UI; and receiving, via the UI, the user's adjustment of the adjustment factor values according to a plurality of data types of the adjustment process factors.

4. The method of claim 3, wherein obtaining the adjustment factor values comprises:

in response to the adjustment process factor being of a category type, receiving, via the UI, the user's selection of a category of each adjustment factor value using a second check box displayed on the UI; and in response to the adjustment process factor being of a numerical type, receiving, via the UI, the user's adjustment of the adjustment factor value using a slider displayed on the UI.

5. The method of claim 3, wherein obtaining the adjustment factor values comprises:

in response to an extreme gradient boosting (XGBoost) algorithm-based model being adopted as the inference model, setting values of the main process factors unselected as the adjustment process factors to preset values; and in response to an algorithm-based model other than the XGBoost algorithm-based model being adopted as the inference model, (1) setting the values of the unselected main process factors to mode values when the unselected main process factors are of a category type or (2) setting the values of the unselected main process factors to median values when the unselected main process factors are of a numerical type.

6. The method of claim 1, wherein the machine learning training comprises:

training, using quality data for machine learning and a corresponding label, four machine learning models respectively implementing a decision tree algorithm, random forest algorithm, extreme gradient boosting (XGBoost) algorithm and light gradient boosting model (LightGBM) algorithm, which are implemented as a tree;

wherein training the four machine learning models is performed to maximize an information gain in each branch constituting the tree based on the corresponding label.

7. The method of claim 6, wherein the machine learning training comprises, in response to a number of process factors constituting the quality data for machine learning exceeding a preset number, performing (1) a T-test on the process factors or (2) a comparison among the information gains of the process factors to select the main process factors such that a number of the main process factors does not exceed the preset number.

8. The method of claim 6, wherein:

the machine learning training comprises selecting, from the four machine learning models, one machine learning model with the best training performance as the inference model, and the training performance comprises an accuracy, precision, recall, and F1 score based on (1) the corresponding label, and (2) the determination generated by each of the four machine learning models.

9. The method of claim 1, further comprising outputting, via the UI, a feature importance for each main process factor for reference in selecting the adjustment process factors, wherein the feature importance is generated as a result of the machine learning training for the inference model.

10. A system for manufacturing a product, the system comprising:

a machine learning-based inference model that is trained in accumulated quality data for the product, the inference model to analyze quality data and operate as a simulator for adjusting a quality control standard for the product;

a processor; and a computer-readable medium in communication with the processor and storing instructions that, when executed by the processor, cause the processor to control the inference model to perform:

during manufacturing and testing of the product, receiving the quality data;

analyzing the quality data with the inference model to generate an analysis report;

receiving a user's selection of a plurality of adjustment process factors from a plurality of main process factors selected for machine learning training for the inference model;

obtaining a plurality of adjustment factor values for the selected adjustment process factors;

generating, using a simulator mode of the inference model, a determination based on the adjustment process factors, wherein the determination indicates a probability of a product being of acceptable or unacceptable quality;

comparing the probability of the determination to a reference probability condition;

repeating obtaining the adjustment factor values, generating the determination, and comparing the probability of the determination to the reference probability condition;

when the probability of the determination meets the reference probability condition, selecting corresponding adjustment factor values as optimal factor values for the adjustment process factors; and changing, based on the optimal factor values, the quality control standard for the adjustment process factors used by the inference model for analyzing quality data for the product to confirm acceptable product quality during subsequent manufacturing of the product.

11. The system of claim 10, further comprising a user interface (UI), wherein, for obtaining the adjustment factor values for the adjustment process factors, the instructions, when executed by the processor, further cause the processor to control the simulator to perform:

receiving, via the UI, the user's selection of adjustment factor values using a plurality of checkboxes displayed on the UI; and adjusting the adjustment factor values according to a plurality of data types of the adjustment process factors.

12. The system of claim 11, wherein the instructions, when executed by the processor, further cause the processor to control the simulator to perform:

in response to an extreme gradient boosting (XGBoost) algorithm-based model being adopted as the inference model, setting values of the process factors unselected from the main process factors to preset values; and in response to an algorithm-based model other than the XGBoost algorithm-based model being adopted as the inference model, setting the values of the unselected process factors to mode values when the unselected process factors are of a category type or the values of the unselected process factors are set to median values.

13. The system of claim 11, wherein:

the UI is further configured to output, via the UI, the determination and a feature importance for each of the main process factors for reference in selecting the adjustment process factors, and the feature importance is generated based on the machine learning training for the inference model.

14. The system of claim 10, further comprising a machine learning trainer configured to:

train, using quality data for machine learning and a corresponding label, four machine learning models respectively implementing a decision tree algorithm, random forest algorithm, extreme gradient boosting (XGBoost) algorithm and light gradient boosting model (LightGBM) algorithm, which are implemented based on a tree;

wherein training the four machine learning models is performed to maximize an information gain in each branch constituting the tree based on the corresponding label.

15. The system of claim 14, wherein, in response to a number of the process factors constituting the quality data for machine learning exceeding a preset number, the machine learning trainer is further configured to perform a T-test on the process factors or a comparison among the information gains of the process factors to select the main process factors such that a number of the process factors does not exceed the preset number.

16. The system of claim 14, wherein:

the machine learning trainer is further configured to select, from the four machine learning models, one with the best training performance as the inference model, and the training performance comprises an accuracy, precision, recall, and F1 score based on (1) the label, and (2) a determination generated by each of the four machine learning models.

17. A non-transitory computer-readable medium storing instructions that, when executed by a processor, cause a processor to control a machine learning-based inference model, that is trained in accumulated quality data for a product, to analyze quality data and as a simulator for adjusting a quality control standard for the product by performing:

during manufacturing and testing of the product, receiving the quality data;

analyzing the quality data with the inference model to generate an analysis report;

receiving a user's selection of a plurality of adjustment process factors from a plurality of main process factors selected for machine learning training for the inference model;

obtaining a plurality of adjustment factor values for the selected adjustment process factors;

generating, using a simulator mode of the inference model, a determination based on the adjustment process factors, wherein the determination indicates a probability of a product being of acceptable or unacceptable quality;

comparing the probability of the determination to a reference probability condition;

repeating obtaining the adjustment factor values, generating the determination, and comparing the probability of the determination to the reference probability condition;

when the probability of the determination meets the reference probability condition, selecting corresponding adjustment factor values as optimal factor values for the adjustment process factors; and changing, based on the optimal factor values, the quality control standard for the adjustment process factors used by the inference model for analyzing quality data for the product to confirm acceptable product quality during subsequent manufacturing of the product.

* * * * *